United States Patent
Baurle et al.

(10) Patent No.: US 9,124,186 B2
(45) Date of Patent: *Sep. 1, 2015

(54) VARYING SWITCHING FREQUENCY AND PERIOD OF A POWER SUPPLY CONTROLLER

(71) Applicant: Power Integrations, Inc., San Jose, CA (US)

(72) Inventors: Stefan Baurle, San Jose, CA (US); Guangchao Darson Zhang, San Jose, CA (US); Arthur B. Odell, Morgan Hill, CA (US); Mingming Mao, Saratoga, CA (US); Michael Yue Zhang, Mountain View, CA (US); Edward Deng, Los Altos, CA (US)

(73) Assignee: Power Integrations, Inc., San Jose, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 14/079,453

(22) Filed: Nov. 13, 2013

(65) Prior Publication Data

US 2014/0063862 A1   Mar. 6, 2014

Related U.S. Application Data

(63) Continuation of application No. 13/193,411, filed on Jul. 28, 2011, now Pat. No. 8,611,116.

(51) Int. Cl.
  *H02M 3/335* (2006.01)
  *H02H 7/122* (2006.01)
  (Continued)

(52) U.S. Cl.
  CPC ............ *H02M 3/33507* (2013.01); *H02M 1/12* (2013.01)

(58) Field of Classification Search
  USPC .................................. 363/21.18, 56.1, 78–80
  See application file for complete search history.

(56) References Cited

U.S. PATENT DOCUMENTS 6,396,718 B1 * 5/2002 Ng et al. .................... 363/21.07
7,593,245 B2   9/2009 Djenguerian et al.
(Continued)

FOREIGN PATENT DOCUMENTS

CN   1913311 A    2/2007
CN   101286703 A  10/2008

OTHER PUBLICATIONS

KR 10201282592—Korean First Office Action with English Translation, issued Aug. 19, 2013 (9 pages).
(Continued)

*Primary Examiner* — Adolf Berhane
*Assistant Examiner* — Gary Nash
(74) *Attorney, Agent, or Firm* — Blakely Sokoloff Taylor & Zafman LLP

(57) ABSTRACT

A controller includes a PWM circuit and a timing circuit. The PWM circuit controls a switch in response to a clock signal. A switching period of the clock signal is based on a charging and discharging time of a capacitor included in the timing circuit. Both first and second current sinks discharge the capacitor while the timing circuit is in a normal discharging mode that is when an on time of the switch is less than a threshold time. The second current sink is prevented from discharging the capacitor such that the capacitor is discharged with the first current sink and not the second current sink while the timing circuit is in an alternative discharging mode that is when the on time of the switch exceeds the threshold time. The discharging of the capacitor in the alternative discharging mode increases the switching period of the clock signal.

23 Claims, 9 Drawing Sheets

(51) Int. Cl.
*H02M 1/00* (2007.01)
*H02M 7/757* (2006.01)
*H02M 1/12* (2006.01)

(56) References Cited

U.S. PATENT DOCUMENTS

| | | | | |
|---|---|---|---|---|
| 8,222,882 | B2* | 7/2012 | Balakrishnan et al. | 323/299 |
| 2008/0007240 | A1* | 1/2008 | Hawley | 323/284 |
| 2008/0246456 | A1* | 10/2008 | Djenguerian et al. | 323/302 |
| 2010/0033992 | A1* | 2/2010 | Fukui et al. | 363/16 |
| 2010/0301959 | A1* | 12/2010 | Liu et al. | 332/109 |
| 2012/0161739 | A1* | 6/2012 | Lund | 323/285 |
| 2013/0027990 | A1 | 1/2013 | Bäurle et al. | |
| 2013/0027996 | A1 | 1/2013 | Bäurle et al. | |

OTHER PUBLICATIONS

Panov, Yuri et al., "Adaptive Off-Time Control for Variable-Frequency, Soft-Switched Flyback Converter at Light Loads," Proceedings of the 30$^{th}$ Annual IEEE Power Electronics Specialists Conference, vol. 1, Aug. 1999, pp. 457-462.
CN 201210268566.3—Chinese Second Office Action with English Translation, issued Dec. 22, 2014 (7 pages).
CN 201210268566.3—Chinese First Office Action and Search Report with English Translation, issued Apr. 28, 2014 (10 pages).
CN 201210266759.5—Chinese First Office Action and Search Report with English Translation, issued May 6, 2014 (22 pages).

\* cited by examiner

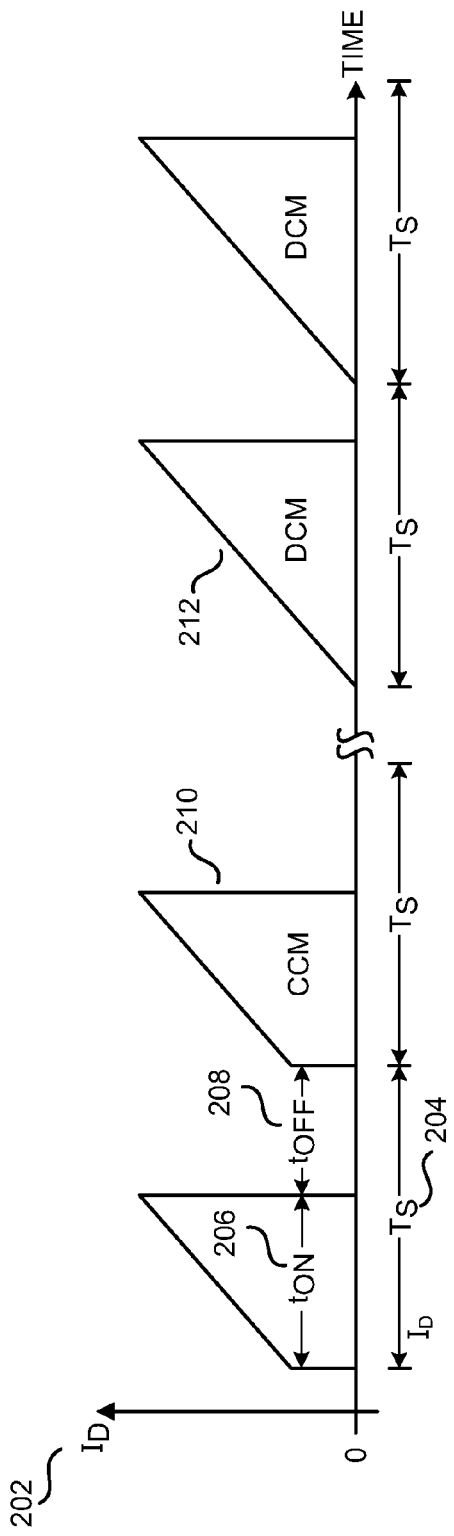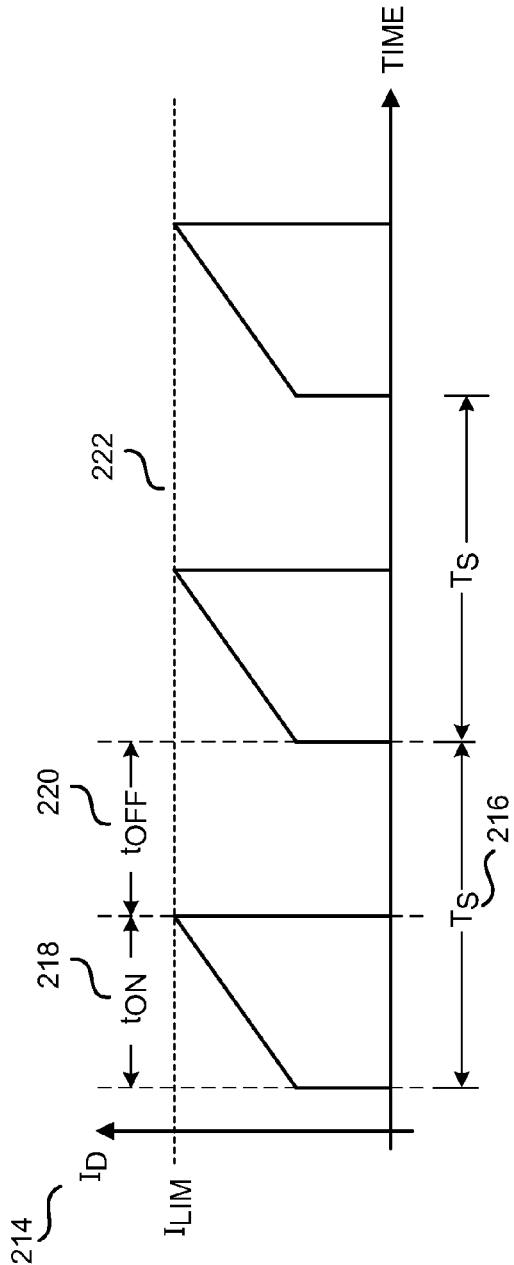

VARYING SWITCHING FREQUENCY AND PERIOD OF A POWER SUPPLY CONTROLLER

CROSS-REFERENCE TO RELATED APPLICATION

This application is a continuation of U.S. application Ser. No. 13/193,411, filed Jul. 28, 2011, now pending. U.S. patent application Ser. No. 13/193,411 is hereby incorporated by reference. This application is also related to U.S. application Ser. No. 13/971,605, filed Aug. 20, 2013, now pending, which is a continuation of U.S. application Ser. No. 13/193,434, filed Jul. 28, 2011, now issued as U.S. Pat. No. 8,531,853.

BACKGROUND INFORMATION

1. Field of the Invention

The present invention relates generally to power supplies, and more specifically, the present invention relates to controllers for switched mode power supplies.

2. Background

Electronic devices use power to operate. Switched mode power supplies are commonly used due to their high efficiency, small size and low weight to power many of today's electronics. Conventional wall sockets provide a high voltage alternating current. In a switching power supply a high voltage alternating current (ac) input is converted to provide a well regulated direct current (dc) output through an energy transfer element. In operation, a switch is utilized to provide the desired output by varying the duty cycle (typically the ratio of the on-time of the switch to the total switching period), varying the switching frequency or varying the number of pulses per unit time of the switch in a switched mode power supply.

The switched mode power supply also includes a controller which usually provides output regulation by sensing and controlling the output in a closed loop. The controller may receive a feedback signal representative of the output and the controller varies one or more parameters in response to the feedback signal to regulate the output to a desired quantity. Various modes of control may be utilized. One mode of control is known as pulse width modulation (PWM) peak current mode control. In PWM peak current mode control, the switch remains on until the current in the switch reaches a current limit. Once the current limit is reached, the controller turns the switch off for the remainder of the switching period. In general, a higher current limit results in a longer on-time of the switch and a bigger duty ratio. However, for controllers operating in continuous conduction mode (CCM) with large duty ratios (typically for duty ratios greater than 50%), small error signal perturbations may cause sub-harmonic oscillation to occur.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 2A is a diagram illustrating an example switching current waveform of the switched mode power supply of FIG. 1.

FIG. 2B is a diagram illustrating a further example of a switching current waveform of the switched mode power supply of FIG. 1 utilizing current mode pulse width modulation (PWM) control.

DETAILED DESCRIPTION

Figure 1:
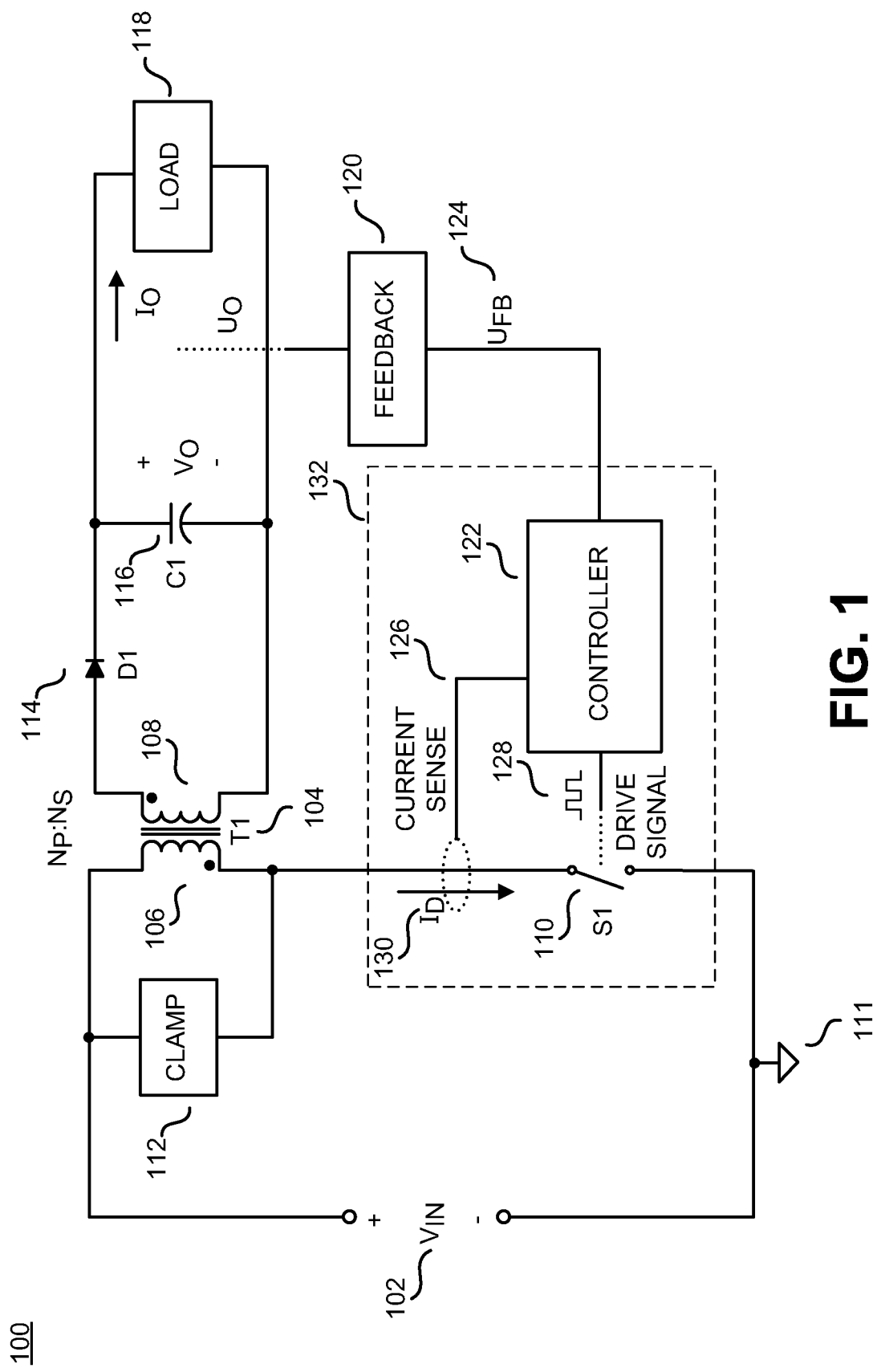
FIG. 1 is a diagram illustrating an example switched mode power supply utilizing a controller, in accordance with embodiments of the present invention.

Embodiments of a controller with a variable switching frequency and period are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

Various modes of control may be utilized to regulate the output of a power supply. One mode of control is known as pulse width modulation (PWM) current mode control. In PWM current mode control, the switch remains on until the current in the switch reaches a current limit or the maximum duty ratio has been reached. In one embodiment, the current limit is the peak current of the switch. Once the current limit is reached, the controller turns the switch off for the remainder of the switching period. In general, a higher current limit results in a longer on-time of the switch and a larger duty ratio. However, for controllers operating in continuous conduction mode (CCM) with large duty ratios (typically for duty ratios greater than 50%), small error signal perturbations may cause sub-harmonic oscillation to occur. In particular, sub-harmonic oscillation may occur for conventional PWM current mode control where the switching frequency (and therefore the switching period $T_S$) does not vary.

Typical methods to prevent sub-harmonic oscillation include varying the current limit with the duty ratio. In such a case, the current limit is not fixed and the current limit is a linearly decreasing ramp as the duty ratio increases. This is typically known as slope compensation. However, there are disadvantages to utilizing slope compensation. For example, in continuous conduction mode (CCM), output power is proportional to the peak current of the switch and the peak current decreases as the current limit linearly decreases. As a result, the output power would decrease for high duty ratios. Slope compensation also erodes the loop bandwidth and phase margin benefits of PWM current mode control. To offset the decrease in output power, the current limit may be increased overall. However, power supply components, such as the switch, transformer, clamp circuit, and output rectifier, would need to be rated for higher current values. This approach has its drawbacks since the higher the current rating for a component typically means an increase in the size of the component. As a result, utilizing current limit slope compensation would result in tradeoffs between size and output power.

With conventional PWM peak current mode control, where the switching frequency is not varied by the controller, sub-harmonic oscillation may occur at high duty ratios when in continuous conduction mode. As a result of sub-harmonic oscillation, the off-times of the switch may vary dramatically from one switching period to the next creating large ripple at the output voltage. Sub-harmonic oscillation may also reduce the maximum output power capability of the power supply. Thus, embodiments of the present invention reduce the likelihood of sustained sub-harmonic oscillation and the resultant large variations in off-time by varying the switching frequency (and therefore the switching period $T_S$) after some critical time $t_C$ when sub-harmonic oscillation may occur. In one embodiment, the total switching period $T_S$ is varied by a multiple of the difference between the on-time $t_{ON}$ and the critical time $t_C$. In a further embodiment, the off-time $t_{OFF}$ of the switch is varied by a multiple of the difference between the on-time $t_{ON}$ and the critical time $t_C$. In one embodiment, the multiple is a fractional amount. In one example, this results in a substantially fixed off-time $t_{OFF}$ over consecutive switching cycles. By varying the switching frequency when the on-time is greater than the critical time $t_C$, the likelihood of sustained sub-harmonic oscillation is reduced. As will be further discussed, embodiments of the present invention include altering a timing circuit voltage to vary the switching frequency.

Referring first to FIG. 1, a diagram of an example switched mode power supply 100 is illustrated including input $V_{IN}$ 102, an energy transfer element T1 104, a primary winding 106 of the energy transfer element T1 104, a secondary winding 108 of the energy transfer element T1 104, a switch S1 110, a clamp circuit 112, a rectifier D1 114, an output capacitor C1 116, a load 118, an output quantity $U_O$, an output voltage $V_O$, an output current $I_O$, a feedback circuit 120, a controller 122, a feedback signal $U_{FB}$ 124, a current sense input 126, a drive signal 128, and switch current $I_D$ 130. The topology of the example switched mode power supply 100 illustrated in FIG. 1 is of the flyback regulator type, which is just one example of a switched mode power supply topology which may benefit from the teachings of the present invention. It is appreciated that other known topologies and configurations of switched mode power supply regulators may also benefit from the teachings of the present invention.

The switched mode power supply 100 provides output power to the load 118 from an unregulated input $V_{IN}$ 102. In one embodiment the input $V_{IN}$ 102 is a rectified and filtered ac line voltage. In another embodiment, the input voltage $V_{IN}$ 102 is a dc input voltage. The input $V_{IN}$ 102 is coupled to the energy transfer element T1 104. In some embodiments of the present invention the energy transfer element T1 104 may be a coupled inductor. In some other embodiments of the present invention the energy transfer element T1 104 may be transformer. In the example of FIG. 1, the energy transfer element T1 104 includes two windings, a primary winding 106 and secondary winding 108. $N_P$ and $N_S$ are the number of turns for the primary winding 106 and secondary winding 108, respectively. The primary winding 106 is further coupled to the active switch S1 110, which is then further coupled to the input return 111. In addition, the clamp circuit 112 is coupled across the primary winding 106 of the energy transfer element T1 104. The secondary winding 108 of the energy transfer element T1 104 is coupled to the rectifier D1 114. In the example illustrated in FIG. 1, the rectifier D1 114 is exemplified as a diode and the secondary winding 108 is coupled to the anode end of the diode. However, in some embodiments the rectifier D1 114 may be a transistor used as a synchronous rectifier. Both the output capacitor C1 116 and the load 118 are coupled to the rectifier D1 114. In the example of FIG. 1, the rectifier D1 114 is exemplified as a diode and both the output capacitor C1 116 and the load 118 are coupled to the cathode end of the diode. An output is provided to the load 118 and may be provided as either an output voltage $V_O$, output current $I_O$, or a combination of the two.

In addition, the switched mode power supply 100 further comprises circuitry to regulate the output which is exemplified as output quantity $U_O$. In general, the output quantity $U_O$ is either an output voltage $V_O$, output current $I_O$, or a combination of the two. A feedback circuit 120 is coupled to sense the output quantity $U_O$. In one embodiment, the feedback circuit 120 may sense the output quantity $U_O$ from the output of the power supply 100. In another embodiment, the feedback circuit 120 may sense the output quantity from an additional winding of the energy transfer element T1 104. Controller 122 is further coupled to the feedback circuit 120 and comprises several terminals. At one terminal, the controller 122 receives a feedback signal $U_{FB}$ 124 from the feedback circuit 120. The controller 122 further includes terminals for the current sense input 126 and the drive signal 128. The current sense input 126 senses the switch current $I_D$ 130 in switch S1 110. In addition, the controller 122 provides a drive signal 128 to the switch S1 110 to control various switching parameters. Examples of such parameters may include switching frequency, switching period, duty cycle, or respective on and off times of the switch S1 110.

In operation, the switched mode power supply 100 of FIG. 1 provides output power to the load 118 from an unregulated input $V_{IN}$ 102, such as an unregulated input voltage. The switched mode power supply 100 utilizes the energy transfer element T1 104 to transform the voltage from the input $V_{IN}$ 102 between the primary 106 and secondary 108 windings. The clamp circuit 112 is coupled to the primary winding 106 of the energy transfer element T1 104 to limit the maximum voltage on the switch S1 110. In one embodiment, the clamp circuit 112 limits the maximum voltage on the switch S1 110. Switch S1 110 is opened and closed in response to the drive signal 128 received from the controller 122. In some embodiments, the switch S1 110 may be a transistor and the controller 122 may include integrated circuits and/or discrete electrical components. In one embodiment controller 122 and switch S1 110 are included together into a single integrated circuit 132. In one example, integrated circuit 132 is a monolithic integrated circuit. In another example, integrated circuit 132 is a hybrid integrated circuit.

In operation, the switching of switch S1 110 produces a pulsating current at the rectifier D1 114. The current in rectifier D1 114 is filtered by output capacitor C1 116 to produce a substantially constant output voltage $V_O$, output current $I_O$, or a combination of the two at the load 118.

The feedback circuit 120 senses the output quantity $U_O$ to provide the feedback signal $U_{FB}$ 124 to the controller 122. In the example of FIG. 1, the controller 122 also receives the current sense input 126 which relays the sensed current $I_D$ 130 in the switch S1 110. The switch current $I_D$ 130 may be sensed in a variety of ways, such as for example the voltage across a discrete resistor or the voltage across the transistor when the transistor is conducting.

The controller 122 outputs a drive signal 128 to operate the switch S1 110 in response to various system inputs to substantially regulate the output quantity $U_O$ to the desired value. With the use of the feedback circuit 120 and the controller 122, the output of the switched mode power supply 100 is regulated in a closed loop. In addition, the controller 122 includes a timing circuit (discussed in more detail below) which defines the switching cycle of the switch S1 110 with a switching period of $T_S$ and a switching frequency of $f_S$, where $T_S=1/f_S$.

In one embodiment of the present invention, the controller 122 may utilize a control scheme which varies the switching frequency $f_S$ when the on-time $t_{ON}$ of the switch S1 110 is greater than a critical time $t_C$. In a further embodiment, the controller 122 decreases the switching frequency $f_S$ (or in other words, extends the switching period $T_S$) when the on-time $t_{ON}$ of the switch S1 110 is greater than a critical time $t_C$. For a fixed load, the switching period (and switching frequency) of the controller 122 may be a fixed period when the on-time is less than the critical time and the controller 122 varies the switching period (or switching frequency) when the on-time $t_{ON}$ of the switch S1 110 is greater than a critical time $t_C$.

As mentioned above, the switching period $T_S$ may vary by some multiple of the difference between the on-time $t_{ON}$ and the critical time $t_C$. In some embodiments, the multiple is a value less than 1. By varying the switching frequency $f_S$ when the switch has an on-time $t_{ON}$ longer than a critical time $t_C$, which corresponds to a large duty ratio, sub-harmonic oscillation may be prevented. In accordance with one embodiment of the present invention, sub-harmonic oscillation may be prevented by modulating the switching frequency $f_S$ (and the switching period $T_S$) of switch S1 110 in response to the on-time $t_{ON}$ of the switch S1 110. As will be further discussed, when the on-time $t_{ON}$ of the switch S1 110 is greater than the critical time $t_C$, a timing circuit included in the controller changes to an alternative discharging mode. Once the switch S1 110 turns off, the timing circuit resumes normal discharging mode. By selecting the rate of discharge of the timing circuit capacitor during the alternative discharging mode, sub-harmonic oscillation may be prevented.

The switching current of various conduction modes is illustrated in FIG. 2A. A diagram of an example switching current waveform of the power supply 100 of FIG. 1 is illustrated including a switching period $T_S$ 204, a switch on-time $t_{ON}$ 206, a switch off-time $t_{OFF}$ 208, trapezoidal shape 210, and triangular shape 212. FIG. 2A illustrates the general waveforms of the switch current $I_D$ 202 over time in both continuous conduction mode (CCM) and discontinuous conduction mode (DCM).

During any switching period $T_S$ 204, switch S1 110 may conduct in response to the drive signal 128 from the controller 122 to regulate the output $U_O$. The switching period $T_S$ 204 may be separated into two sections of time: switch on-time $t_{ON}$ 206 and switch off-time $t_{OFF}$ 208. Switch on-time $t_{ON}$ 206 denotes the portion of the switching period $T_S$ 202 which the switch S1 110 is conducting. Switch off-time $t_{OFF}$ 208 denotes the remaining portion of the switching period $T_S$ 202 when the switch S1 110 is not conducting. The current waveform of FIG. 2 shows two fundamental modes of operation. The trapezoidal shape 210 is characteristic of continuous conduction mode (CCM) whereas the triangular shape 212 is characteristic of discontinuous conduction mode (DCM). During CCM, the switch current $I_D$ 202 is substantially non-zero immediately after the start of the switch on-time $t_{ON}$ 206 and steadily increases throughout the switch on-time $t_{ON}$ 208. At DCM, the switch current $I_D$ 202 is substantially zero immediately after the beginning of the switch on-time $t_{ON}$ 206 and steadily increases throughout the switch on-time $t_{ON}$ 206. During the switch off-time $t_{OFF}$ 204, the switch current $I_D$ 202 is substantially zero for both CCM and DCM.

Sub-harmonic oscillation generally occurs when conventional controllers utilize PWM current mode control and operate in CCM at duty ratios greater than or equal to 50%. FIG. 2B demonstrates the general waveform of switch current $I_D$ of FIG. 1 with respect to time when PWM current mode control of the switch S1 110 is used to regulate the output quantity $U_O$. FIG. 2B illustrates switch current $I_D$ 214, switching period $T_S$ 216, switch on-time $t_{ON}$ 218, switch off-time $t_{OFF}$ 220, and a current limit $I_{LIM}$ 222. In the example of FIG. 2B, the controller 122 is operating in CCM.

The switch S1 110 conducts at the beginning of each switching period $T_S$ 216. Switch S1 110 conducts until the switch current $I_D$ 214 reaches the current limit $I_{LIM}$ 222. In one example, control of the current limit $I_{LIM}$ 222 at a constant switching period $T_S$ 216 (otherwise known as fixed switching frequency $f_S$) maintains the peak of the switch current $I_D$ 214 at a value required to regulate the output quantity $U_O$. In general, a higher current limit $I_{LIM}$ 222 results in a longer switch on-time $t_{ON}$ 218. In some embodiments of the present invention, the current limit $I_{LIM}$ 222 is also the peak primary current $I_{PEAK}$. The regulation is accomplished by a PWM technique known as fixed frequency PWM current mode control, fixed frequency PWM current programmed control, and/or peak current mode control.

It should be appreciated however, that the term "fixed frequency control" does not necessarily entail that the switching frequency $f_S$ of the switch S1 110 remains unchanged. Instead, the use of the term "fixed frequency control" may merely indicate that the switching frequency $f_S$ of the switch is not used as a control variable to regulate the output quantity $U_O$. For the example of fixed frequency PWM current mode control, the value of the current limit $I_{LIM}$ 222 is utilized as the control variable to regulate the output quantity $U_O$. For various embodiments, varying the switching frequency $f_S$ to prevent sub-harmonic oscillation may still be utilized along fixed frequency control modes since the switching frequency $f_S$ is not utilized as a control variable to regulate the output quantity $U_O$. In addition, frequency modulation for EMI emissions (also referred to as frequency jitter) may also be utilized with varying of the switching frequency to prevent sub-harmonic oscillation.

Figure 3:
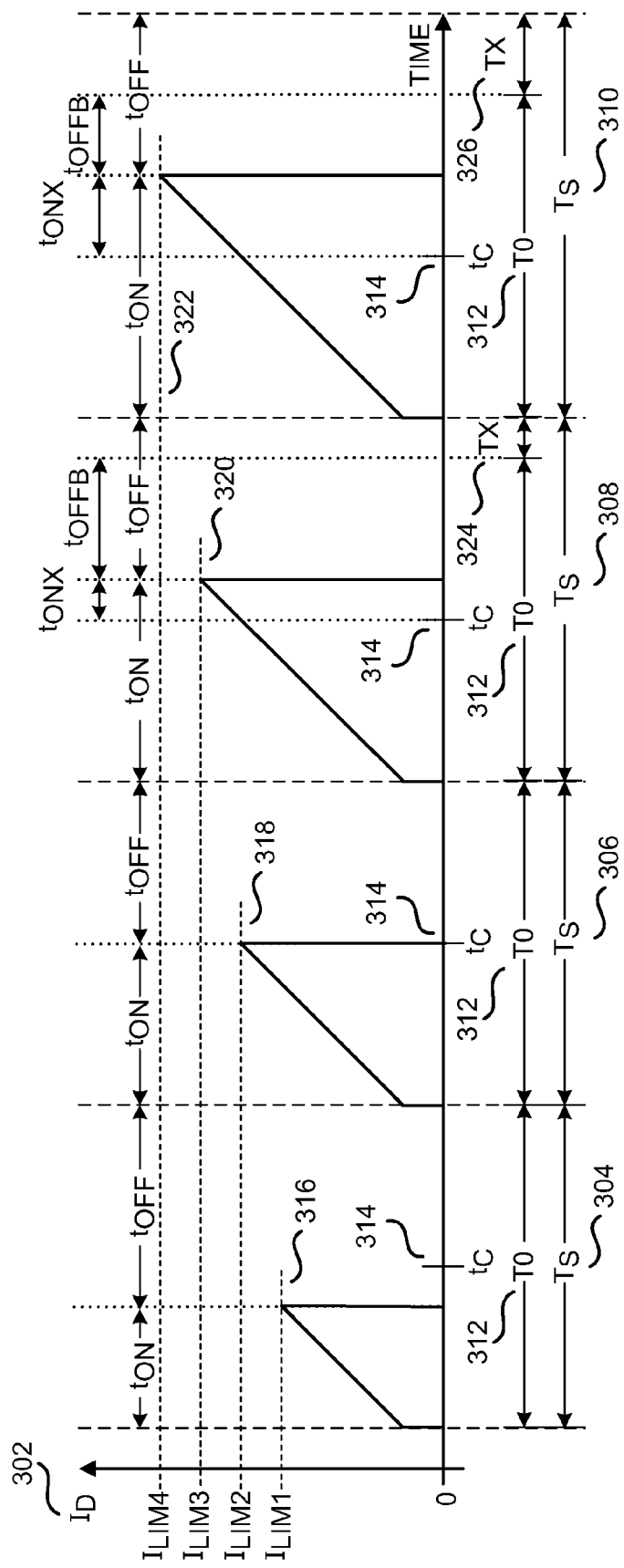
FIG. 3 is a diagram illustrating an example switching current waveform of FIG. 1 utilizing a control scheme in accordance with embodiments of the present invention.

Referring next to FIG. 3, a diagram of example switching current waveform $I_D$ of the power supply 100 utilizing a control scheme which varies the switching frequency $f_S$ and the off-time $t_{OFF}$ of the switch is illustrated including switch current $I_D$ 302, switching periods $T_S$ 304, 306, 308, and 310, base period T0 312, critical time $t_C$ 314, a first current limit ILIM1 316, a second current limit ILIM2 318, a third current limit ILIM3 320, and a fourth current limit ILIM4 322. In addition, each switching period $T_S$ 304, 306, 308, and 310 has a respective on-time $t_{ON}$ and off-time $t_{OFF}$. As shown in FIG.

3, switching periods $T_S$ 308 and 310 also include a respective extended on-time $I_{ONX}$, a base off-time $t_{OFFB}$, and extension periods TX 324 and 326.

As mentioned above with respect to FIG. 2B, switch S1 110 conducts at the beginning of every switching period $T_S$ until the current limit for the respective switching period $T_S$ is reached. FIG. 3 illustrates the controller 122 operating in CCM and utilizing current mode control. As mentioned above, a larger current limit typically results in a longer on-time $t_{ON}$. In general, how quickly the switch current $I_D$ 302 increases to the current limit is partially dependant on the input voltage $V_{IN}$ 102 and the inductance $L_P$ of the primary winding 106.

During switching period $T_S$ 304, the switch current $I_D$ 302 increases until it reaches the first current limit $I_{LIM1}$ 316. As illustrated, the on-time $t_{ON}$ during the switching period $T_S$ 304 is less than the critical time $t_C$ 314. As a result, the switching period $T_S$ 304 and the off-time $t_{OFF}$ are not altered and as a result the switching period $T_S$ 304 is fixed to be substantially equal to the base period T0 312. In one embodiment, critical time $t_C$ 314 is substantially equal to one half the base period T0 312, or mathematically: $t_C=\frac{1}{2}T0$. The value of the critical time $t_C$ is the point in time which sub-harmonic oscillation may occur if the switching frequency does not change.

During switching period $T_S$ 306, the switch current $I_D$ 302 increases until it reaches the second current limit $I_{LIM2}$ 318. As illustrated, the on-time $t_{ON}$ during switching period $T_S$ 306 is substantially equal to critical time $t_C$ 314 and the switching period $T_S$ 306 and the off-time $t_{OFF}$ are not altered. Thus, the switching period $T_S$ 306 is also fixed to be substantially equal to the base period T0 312. When the on-time $t_{ON}$ is substantially less than or equal to critical time $t_C$ 314, as shown in switching periods $T_S$ 304 and 306, the controller 122 is in a normal operating mode where switching periods $T_S$ 304 and 306 are a fixed switching period. In one embodiment, a fixed switching period is a switching period that does not vary and is predetermined according to a set frequency of a timing circuit (e.g., an oscillator) included in controller 122.

However, during switching period $T_S$ 308, the switch current $I_D$ 302 increases until it reaches the third current limit $I_{LIM3}$ 320. As illustrated, the on-time $t_{ON}$ during switching period $T_S$ 308 is greater than critical time $t_C$ 314. In accordance with the embodiment of FIG. 3, the switching period $T_S$ 308 is extended beyond the base period T0 312 by extension period TX 324. As will be further discussed, the length of extension period TX 324 is dependent on how long the on time $t_{ON}$ extends past the critical time $t_C$ 314. In other words, how much the switching period $T_S$ 308 is extended depends on the difference between the on-time $t_{ON}$ and the critical time $t_C$ 314, also shown as extended on-time $t_{ONX}$ in switching period $T_S$ 308 ($t_{ONX}=t_{ON}-t_C$).

During switching period $T_S$ 310, the switch current $I_D$ 302 increases until it reaches the fourth current limit $I_{LIM4}$ 322. As illustrated, the on-time $t_{ON}$ during switching period $T_S$ 310 is greater than critical time $t_C$ 314 and the switching period $T_S$ 310 and as a result is extended beyond the base period T0 312 by extension period TX 326. The length of the extension period TX 326 is dependent on the extended on-time $t_{ONX}$ during switching period $T_S$ 310.

As illustrated by switching periods 308 and 310, the switching period $T_S$ may be expressed as a function of the base period T0 312 and the extension period TX:

$$T_S = T0 + TX \qquad (1)$$

The length of the extension period TX is dependent on the extended on-time $t_{ONX}$ during the respective switching period $T_S$. As described above with reference to switching periods 304 and 306, the switching period is fixed and substantially equal to the base period T0 312 when the on-time $t_{ON}$ is less than or equal to the critical time $t_C$ 314. Also, the extension periods TX 324 and 326 may be written as:

$$TX = k(t_{ON} - t_C) = kt_{ONX} \qquad (2)$$

Where k is an extension coefficient and $0 \leq k$. In one embodiment, the extension coefficient k is a constant. In another embodiment, the extension coefficient k is not constant (as will be further discussed). It should be appreciated, that an extension in the switching period $T_S$ results in a decrease in the switching frequency $f_S$. In one embodiment, the value of the extension coefficient k may depend on various parameters of the controller 122 (such as parameters of a timing circuit of the controller 122, extended on-time $t_{ONX}$, base period T0, on-time $t_{ON}$, or the duty ratio D). By determining the value of the extension coefficient k, sub-harmonic oscillation may be prevented. In other words, by determining how much the extended on-time $t_{ONX}$ affects the switching period $T_S$, sub-harmonic oscillation may be prevented. As illustrated by equations 1 and 2, the switching period $T_S$ may vary by a multiple of the difference between the on-time $t_{ON}$ and the critical time $t_C$ 314.

Further, the off-time $t_{OFF}$ may vary from the base off-time $t_{OFFB}$ and the amount of variation is also dependant on the difference between the on-time $t_{ON}$ and the critical time $t_C$ 314 ($t_{ONX}$). As illustrated, the off-time $t_{OFF}$ may be expressed as a function of the base off-time $t_{OFFB}$ and extension period TX when the on-time $t_{ON}$ is greater than the critical time $t_C$ 314:

$$t_{OFF} = t_{OFFB} + TX \qquad (3)$$

where the base off-time $t_{OFFB}$ is the difference between the base period T0 312 and the on-time $t_{ON}$: $t_{OFFB} = T0 - t_{ON}$. In other words, the base off-time $t_{OFFB}$ represents the value of the off-time $t_{OFF}$ if the switching period $T_S$ was not extended past the base period T0 312 in accordance with embodiments. It should be noted that the off-time $t_{OFF}$ is substantially equal to the base off-time $t_{OFFB}$ when the on-time $t_{ON}$ is less than or equal to the critical time $t_C$ 314. By substituting equation (2) into equation (3), the off-time may be expressed as:

$$t_{OFF} = t_{OFFB} + kt_{ONX} \qquad (4)$$

As shown by equation 4, the off-time $t_{OFF}$ may vary by a multiple of the difference between the on-time $t_{ON}$ and the critical time $t_C$ 314.

Further, sub-harmonic oscillation may also be prevented by ensuring the off-time $t_{OFF}$ is greater than or equal to a limit determined by the base period T0 and the on-time $t_{ON}$:

$$t_{OFF} \geq \frac{T0^2}{4t_{ON}} \qquad (5)$$

Utilizing equation (5), the switching period $T_S$ may be expressed as:

$$T_S \geq t_{ON} + \frac{T0^2}{4t_{ON}} \qquad (6)$$

Utilizing equations (5) and (6), the switching period $T_S$ may then be manipulated and expressed as a function of the base period T0, the extended on-time $t_{ONX}$, and the extension coefficient k such as equations (1) and (2):

$$T_S \geq T0 + \left(\frac{t_{ONX}}{\frac{T0}{2} + t_{ONX}}\right) t_{ONX} \quad (7)$$

From equation (7), the extension coefficient, k is a function of the extended on-time $t_{ONX}$ and the base period T0:

$$k = \frac{t_{ONX}}{\frac{T0}{2} + t_{ONX}}.$$

As such, in one embodiment, sub-harmonic oscillation may be prevented when the switching period $T_S$ is greater than or equal to the quantity illustrated in equation (7).

Figure 4:
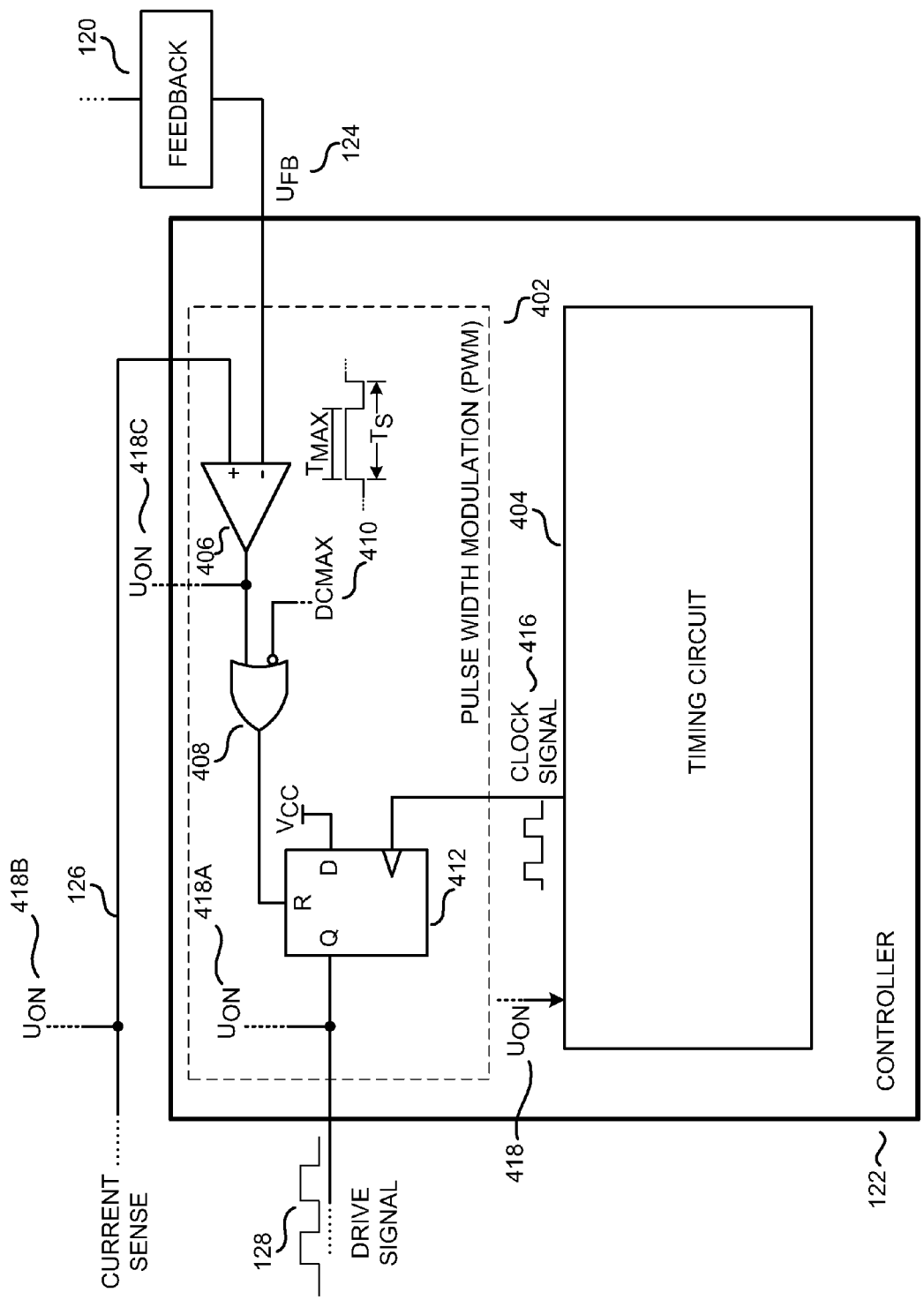
FIG. 4 is a block diagram illustrating a controller in accordance with embodiments of the present invention.

Referring next to FIG. 4, a block diagram of an example of controller 122 is illustrated including a pulse width modulation (PWM) block 402 and a timing circuit 404. The PWM block 402 includes a comparator 406, an OR gate 408, and a flip-flop 412. Further illustrated in FIG. 4 is the feedback circuit 120, feedback signal $U_{FB}$ 124, current sense signal 126, drive signal 128, DCMAX signal 410, clock signal 416, and on-time signal $U_{ON}$ 418.

The controller 122 includes PWM block 402 and timing circuit 404. PWM block 402 is coupled to receive the current sense signal 126 and feedback signal $U_{FB}$ 124. The PWM block 402 is also coupled to the timing circuit 404 to receive the clock signal 416. Optionally, the PWM block 402 may also receive DCMAX signal 410 from the timing circuit 404. Utilizing the clock signal 416, DCMAX signal 410, current sense signal 126 and the feedback signal $U_{FB}$ 124, the PWM block 402 outputs the drive signal 128.

PWM block 402 further includes comparator 406, OR gate 408, and flip-flop 412. The comparator 406 is coupled to receive current sense signal 126 and feedback signal $U_{FB}$ 124. In the example shown, the current sense signal 126 is received at the non-inverting input of comparator 406 while the feedback signal $U_{FB}$ 124 is received at the non-inverting input of comparator 406. In one embodiment, the feedback signal $U_{FB}$ 124 is a voltage signal or a current signal and may be representative of the current limit of the switch S1 110. In another embodiment, comparator 406 receives a variable current limit that is determined responsive to a value of feedback signal $U_{FB}$ 124. Further, the current sense signal 126 is a voltage signal or a current signal and is representative of the switch current $I_D$ 130. When the value of the current sense signal 126 is greater than the value of the current limit provided by the feedback signal $U_{FB}$ 124, the output of comparator 406 is logic high. Otherwise, the output of comparator 406 is logic low.

The output of comparator 406 couples to one input of OR gate 408. The other input of OR gate 408 is coupled to receive the DCMAX signal 410. DCMAX signal 410 is a rectangular waveform with varying lengths of logic high and logic low sections. In one example, the falling edge of the logic high section corresponds to the maximum duty ratio $D_{MAX}$. In another example, the length of the logic high section of DCMAX signal 410 corresponds to the maximum duty ratio. However, the small circle at the input of the OR gate 408 indicates that the OR gate 408 receives the inverted DCMAX signal 410.

The flip-flop 412 couples to OR gate 408 and to timing circuit 404. In the example shown, the flip-flop 412 is D flip-flop and the timing circuit 404 is coupled to provide the clock signal 416 to the clock-input of flip-flop 412. The clock signal 416 is a rectangular pulse waveform and the amount of time between consecutive rising edges is substantially equal to the switching period $T_S$. Further, the output of OR gate 408 is coupled to the reset-input of flip-flop 412. As shown, the D-input of flip-flop 412 is coupled to receive a logic high value. The flip-flop 412 then outputs the drive signal 128 to the switch S1 110. Drive signal 128 is a rectangular waveform with varying lengths of logic high and logic low sections. In one embodiment, the logic high sections correspond to an on-time of switch S1 110 while the logic low sections correspond to an off-time of switch S1 110.

The timing circuit 404 receives the on-time signal $U_{ON}$ 418 and outputs the clock signal 416 to the PWM block 402. Optionally, the timing circuit 404 may also provide the DCMAX signal 410 to the PWM block 402. On-time signal $U_{ON}$ 418 provides information regarding the on-time of the switch S1 110 and may be a rectangular pulse waveform with varying lengths of logic high and logic low sections. In one example, the drive signal 128 may be utilized for the on-time signal, such that the timing circuit 404 is coupled to an output of flip-flop 412 to receive on-time signal $U_{ON}$ 418A. Alternatively, the current sense signal 126 may be utilized for the on-time signal $U_{ON}$ 418, such that the timing circuit 404 is coupled to receive on-time signal $U_{ON}$ 418B. In yet another example, the output of comparator 406 may be utilized for the on-time signal $U_{ON}$ 418, such that the timing circuit 404 is coupled to the output of comparator 406 to receive on-time signal $U_{ON}$ 418C.

The timing circuit 404 provides the switching period $T_S$ to the PWM block 402 via the clock signal 416. That is, in one example, the period of clock signal 416 is the switching period $T_S$. In one example, an oscillator may be utilized for the timing circuit 404. Utilizing the on-time $t_{ON}$ of the switch S1 110 provided by the on-time signal $U_{ON}$ 418, the timing circuit 404 varies the switching period $T_S$ by a multiple of the difference between the on-time $t_{ON}$ and the critical time $t_C$. In embodiments, the timing circuit 404 does not vary the switching period $T_S$ unless the on-time $t_{ON}$ is greater than the critical time $t_C$. In one embodiment, the clock signal 416 is a rectangular pulse waveform. In one embodiment, the rising edge of the clock signal 416 indicates the beginning of switching period $T_S$.

In operation, when the clock signal 416 pulses to a logic high value signaling the beginning of a switching period $T_S$. The output of the flip-flop 412 transitions to a logic high value (due to the logic high at the D-input) and the drive signal 128 turns the switch S1 110 on. In one embodiment, clock signal 416 falls to a logic low value when the critical time $t_C$ is reached and the output of the latch 412 remains at the logic high value until the flip-flop 412 is reset. If either the output of comparator 406 is logic high (corresponding to when the value of the current sense signal 126 is greater than the value of the current limit provided by the feedback signal $U_{FB}$ 124) or the inverted DCMAX signal 410 is logic high (or both), the output of OR gate 408 is logic high. When the flip-flop 412 receives a logic high value at the reset-input, the drive signal 128 (i.e. output of the flip-flop 412) transitions to a logic low value and the switch S1 110 is turned off. Examples of timing waveforms for the clock signal 416 and DCMAX signal 410 will be discussed with respect to FIG. 8.

Figure 5A:
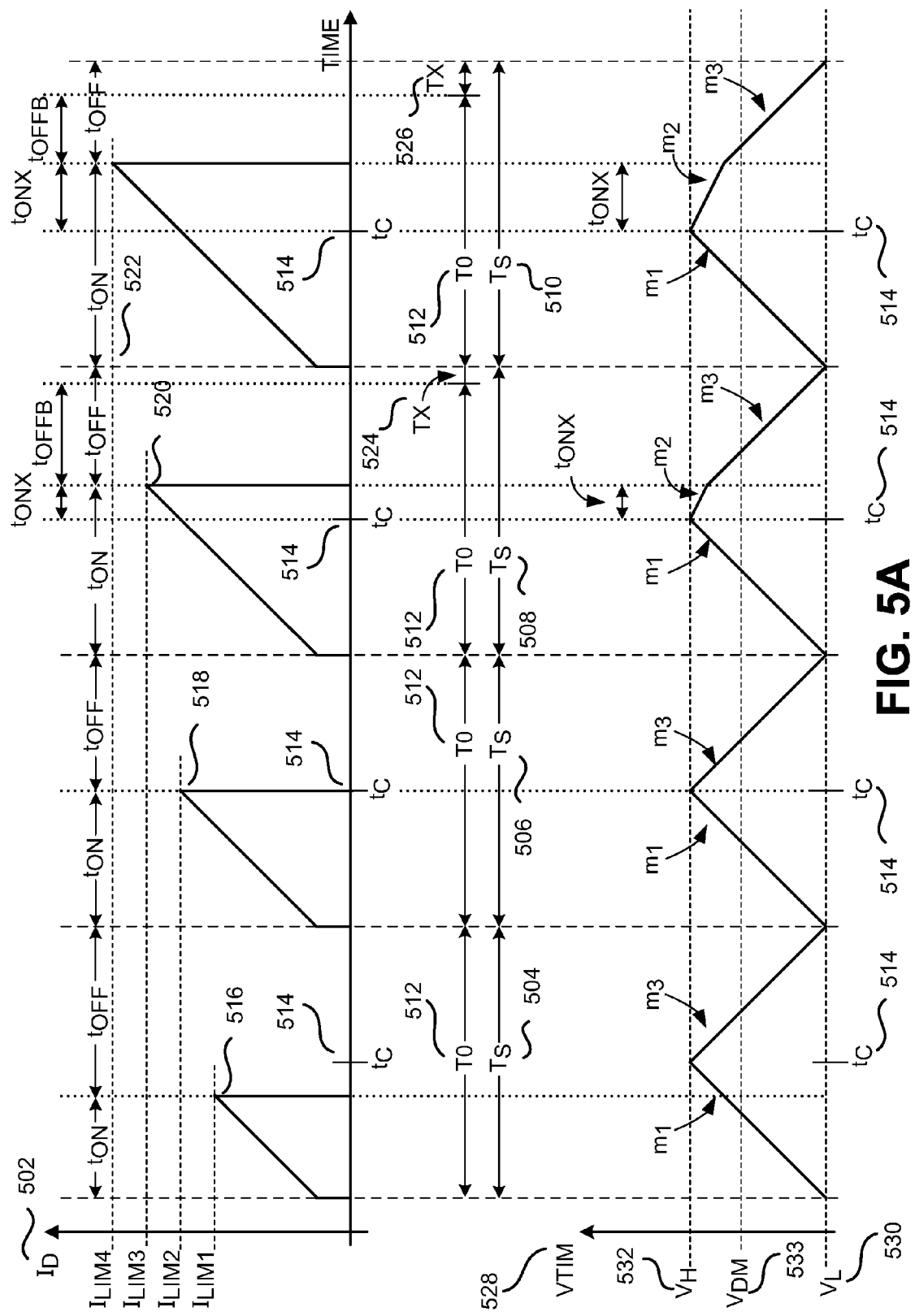
FIG. 5A is a diagram illustrating an example voltage waveform utilizing a linear slope of the timing circuit of FIG. 4.

Referring next to FIG. 5A, a diagram illustrating voltage waveform VTIM 528 of the timing circuit 404 of FIG. 4 is shown including a lower reference voltage $V_L$ 530, an upper reference voltage $V_H$ 532, a max duty ratio voltage $V_{DM}$ 533, and critical time $t_C$ 514. Further illustrated in FIG. 5A is switch current $I_D$ 502, switching periods $T_S$ 504, 506, 508, and 510, base period T0 512, critical time $t_C$ 514, a first current limit ILIM1 516, a second current limit ILIM2 518, a third current limit ILIM3 520, and a fourth current limit ILIM4 522. In addition, each switching period $T_S$ 504, 506, 508, and 510 has a respective on-time $t_{ON}$ and off-time $t_{OFF}$. As shown in FIG. 5A, switching periods $T_S$ 508 and 510 also include a respective extended on-time $t_{ONX}$, a base off-time $t_{OFFB}$, and extension periods TX 524 and 526.

The waveform representing the switch current $I_D$ 502 is similar to the switch current $I_D$ 302 illustrated in FIG. 3 along with corresponding reference numbers. FIG. 5A illustrates one example of a timing voltage VTIM 528 for the respective switch current $I_D$ 502. In one embodiment, timing circuit 404 includes a timing capacitor (discussed below), where the timing voltage VTIM 528 is the voltage across the timing capacitor. In each switching period, the timing voltage VTIM 528 increases with slope $m_1$ until it reaches the upper reference voltage $V_H$ 532 and then decreases until it reaches lower reference voltage $V_L$ 530. However, timing circuit 404 may include two modes for discharging the capacitor to the lower reference voltage $V_L$ 530. In a normal discharging mode the timing voltage VTIM 528 decreases with slope $m_3$ until the lower reference voltage $V_L$ 530 is reached. When the on-time $t_{ON}$ is greater than the critical time $t_C$, the timing circuit 404 switches to an alternative discharging mode and the timing voltage VTIM 528 discharges with two or more slopes (e.g., $m_2$ and $m_3$) that are either negative or zero. In one embodiment, at the end of on-time $t_{ON}$, the timing circuit 404 changes from the alternative discharging mode to the normal discharging mode and the timing voltage VTIM 528 decreases with slope $m_3$. In addition, the upper reference voltage $V_H$ 532 may correspond to the critical voltage $V_C$. The critical voltage $V_C$ indicates when the timing circuit is at 50% of the base period T0 512. In other words, at critical time $t_C$ 514, the value of timing voltage VTIM 528 is substantially equal to the upper reference voltage $V_H$ 532. As shown, the timing voltage VTIM 528 utilizes three voltage thresholds.

At the beginning of each switching period, the timing voltage VTIM 528 begins at the lower reference voltage $V_L$ 530 and increases to the upper reference voltage $V_H$ 532. Once at the upper reference voltage $V_H$ 532, the timing voltage VTIM 528 decreases until it reaches the lower reference voltage $V_L$ 530. When the timing voltage VTIM 528 reaches the lower reference voltage $V_L$ 530, the current switching period has ended and a new switching period has begun. As such, the time for the timing voltage VTIM 528 to rise to the lower reference voltage $V_L$ 530 and subsequently decrease to the upper reference voltage $V_H$ 532 determines the length of the switching period $T_S$. In other words, the switching period $T_S$ of clock signal 416 is equal to a charging time that the timing capacitor charges to an upper reference voltage $V_H$ 532 plus a discharging time that the timing capacitor discharges to a lower reference voltage $V_L$ 530.

During switching period $T_S$ 504, the on-time $t_{ON}$ is less than the critical time $t_C$ 514 and the switching period $T_S$ 504 is not extended beyond the base period T0 512. As a result, the timing circuit 404 operates in a normal discharging mode. As shown by FIG. 5A, the timing voltage VTIM 528 rises to the upper reference voltage $V_H$ 532 with slope $m_1$ and falls to the lower reference voltage $V_L$ 530 with slope $m_3$ without interruption. In one embodiment, the magnitude of slope $m_3$ is substantially equal to the magnitude of slope $m_1$, or mathematically: $|m_3|=|m_1|$.

During switching period $T_S$ 506, the on-time $t_{ON}$ is substantially equal to the critical time $t_C$ 514 and the switching period $T_S$ 506 is not extended beyond the base period T0 512. Similar to switching period $T_S$ 504, the timing circuit 404 operates in a normal discharging mode and the timing voltage VTIM 528 rises to the upper reference voltage $V_H$ 532 with slope $m_1$ and falls to the lower reference voltage $V_L$ 530 with slope $m_3$ without interruption.

During switching period $T_S$ 508, the on-time $t_{ON}$ is greater than the critical time $t_C$ 514. As a result, the timing circuit 404 operates in an alternative discharging mode and the switching period $T_S$ 504 is extended beyond the base period T0 512. In the example of FIG. 5A, the timing voltage waveform VTIM 528 rises with slope $m_1$ until the on-time $t_{ON}$ is substantially equal to the critical time $t_C$ 514. In other words, the timing voltage waveform VTIM 528 increases with slope $m_1$ until the upper reference voltage $V_H$ 532 is reached. When the upper reference voltage $V_H$ 532 is reached, the timing circuit 404 switches to an alternative discharging mode and the timing voltage VTIM 528 will decrease with slope $m_2$. As further shown in FIG. 5A, the upper reference voltage $V_H$ 532 corresponds to the value of the timing voltage VTIM 528 when the on-time $t_{ON}$ is substantially equal to the critical time $t_C$ 514. In other words, the time at which the timing voltage VTIM 528 reaches the upper reference voltage $V_H$ 532 is the time at which the on time $t_{ON}$ reaches the critical time $t_C$ 514, and the timing circuit 404 then switches to an alternative discharging mode where the timing voltage VTIM 528 decreases with slope $m_2$.

In the example shown in FIG. 5A, the slope $m_2$ is less than slope $m_3$. In one embodiment, slope $m_2$ is equal to one half of slope $m_3$ or mathematically: $m_2 = \frac{1}{2}m_3$. As will be further discussed, the ratio between slope $m_2$ and slope $m_3$ (and subsequently slope $m_1$) may alternatively be expressed in terms of the duty ratio. The timing voltage VTIM 528 will decrease with slope $m_2$ until the switch S1 110 is turned off. In other words, during the extended on-time $t_{ONX}$, the rate of decrease of the timing voltage waveform VTIM 528 is determined by slope $m_2$. Once the switch S1 110 is turned off, the timing voltage waveform VTIM 528 decreases with slope $m_3$ until the lower reference voltage $V_L$ 530 is reached. FIG. 5A illustrates that slope $m_2$ is constant, resulting in a linear decrease of the timing voltage VTIM. In another embodiment, slope $m_2$ is not constant, resulting in a non-linear decrease of the timing voltage VTIM.

During switching period $T_S$ 510, the on-time $t_{ON}$ is greater than the critical time $t_C$ 514. However, the on-time $t_{ON}$ during switching period $T_S$ 510 is longer than the on-time $t_{ON}$ during switching period $T_S$ 508. In other words, the extended on-time $t_{ONX}$ during switching period $T_S$ 510 is longer than the extended on-time $t_{ONX}$ during switching period $T_S$ 508. Similar to the previous switching period, the timing voltage VTIM 528 rises with slope $m_1$ to the upper reference voltage $V_H$ 532. The timing voltage VTIM 528 then decreases with slope $m_2$ for the remainder of the on-time $t_{ON}$. Once the switch S1 110 is turned off, the timing voltage VTIM 528 decreases further with slope $m_3$ to the lower reference voltage $V_L$ 530.

Further illustrated in FIG. 5A is max duty ratio voltage $V_{DM}$ 533. As will be further discussed if the timing voltage waveform VTIM 528 falls below the max duty ratio voltage $V_{DM}$ 533 after the timing voltage waveform VTIM 528 has reached the upper reference voltage $V_H$ 530 and before the switch S1 110 is turned off, the DCMAX signal 410 is enabled and the switch S1 110 is turned off. Fixing the max duty ratio voltage $V_{DM}$ 533 ensures a minimum off-time $t_{OFF}$ of the switch S1 110 and further prevents sub-harmonic oscillation.

As mentioned above with respect to FIG. 3, the switching period $T_S$ may be expressed in terms of the base period T0 512 and the extension period TX. Further, the extension period TX may be expressed in terms of the extended on-time $t_{ONX}$. By combining equations (1) and (2), the switching period $T_S$ may be expressed as:

$$T_S = T0 + kt_{ONX} \quad (8)$$

where $t_{ONX} = t_{ON} - t_C$. As mentioned above, the value of the extension coefficient k may be partially determined by the properties of the controller 122 and the timing circuit 404. For a timing circuit 404 with an alternative discharging mode, once the on-time $t_{ON}$ is greater than the critical time $t_C$, the extension coefficient k is proportional to the ratio of slope $m_2$ to slope $m_3$. For example, the extension coefficient k may be the difference between the value of one and the ratio of slope $m_2$ to slope $m_3$, expressed as:

$$k = 1 - \left|\frac{m_2}{m_3}\right| \quad (9)$$

However, since $|m_3|=|m_1|$, the extension coefficient may also be expressed in terms of slope $m_2$ and slope $m_1$. By combining equation (8) and equation (9) and expressing equation (9) in terms of slope $m_1$, the switching period $T_S$ may be expressed as:

$$T_S = T0 + \left(1 - \left|\frac{m_2}{m_1}\right|\right) t_{ONX} \quad (10)$$

As illustrated in equation (10), the switching period $T_S$ may vary by some multiple of the difference between the on-time $t_{ON}$ and the critical time $t_C$. Further, the switching period $T_S$ can also be expressed in terms of the duty ratio D, slope $m_1$, slope $m_2$, and the base period T0:

$$T_S = \frac{T0\left(1 + \left|\frac{m_2}{m_1}\right|\right)}{2\left(1 - D + D\left|\frac{m_2}{m_1}\right|\right)} \quad (11)$$

As mentioned above, the compensation coefficient k may equal:

$$k = \frac{t_{ONX}}{\frac{T0}{2} + t_{ONX}}.$$

By comparing equation (10) with equation (7), we can determine a boundary relationship for slope $m_2$ and $m_1$. For stability:

$$1 - \left|\frac{m_2}{m_1}\right| \geq \frac{t_{ONX}}{\frac{T0}{2} + t_{ONX}} \quad (12)$$

Which can be simplified to:

$$\left|\frac{m_2}{m_1}\right| \leq \frac{1}{1 + \frac{2t_{ONX}}{T0}} \quad (13)$$

In one embodiment, sub-harmonic oscillation may be prevented by utilizing equation (13) to determine the ratio between slope $m_2$ and slope $m_1$.

In another embodiment of the present invention, for a constant slope $m_2$, the ratio of slope $m_2$ and $m_1$ is partially determined by the maximum duty ratio:

$$\left|\frac{m_2}{m_1}\right| \leq \frac{1 - D_{MAX}}{D_{MAX}} \quad (14)$$

As such, the boundary equation for the compensation coefficient k of equation (9) may be expressed as:

$$k \geq \frac{2D_{MAX} - 1}{D_{MAX}} \quad (15)$$

For the example shown in of FIG. 5A, the maximum duty ratio is substantially 66%. By utilizing equations (14) and (15) the slope $m_2$ is substantially one-half the magnitude of slope $m_1$ and the extension coefficient k is substantially one-half. As such, the extension period TX (the amount of time which the switching period $T_S$ is extended beyond the base period T0 512) is substantially one half of to the extended on-time $t_{ONX}$.

In another example, the slope $m_2$ is substantially equal to zero. When slope $m_2$ is zero, the extension coefficient k is substantially one. As such, in this example, the extension period TX is substantially equal to the extended on-time $t_{ONX}$. As will be further discussed with respect to FIG. 5B, the slope $m_2$ may vary as a function of the duty ratio and/or on-time $t_{ON}$.

Figure 5B:
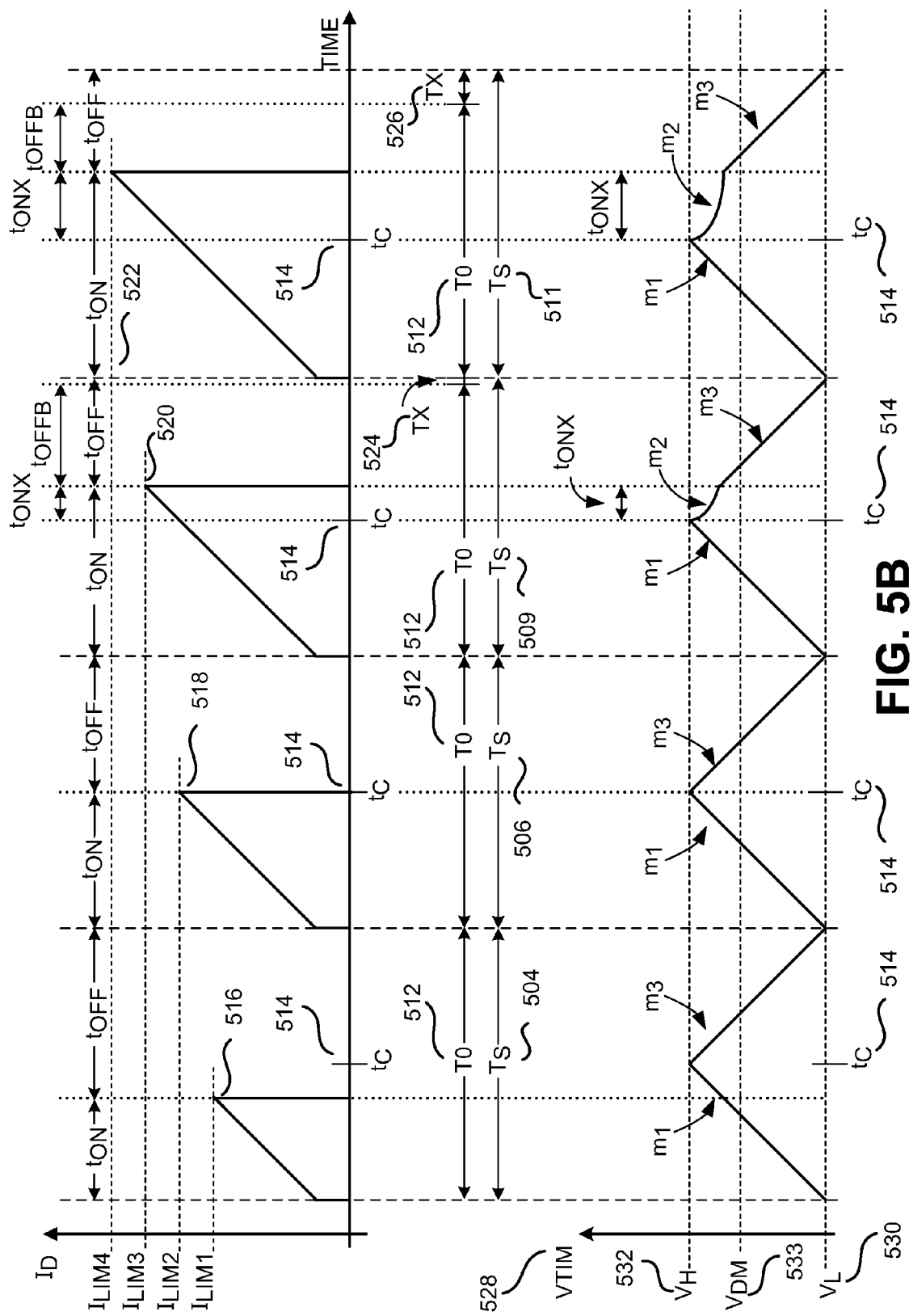
FIG. 5B is a diagram illustrating another example voltage waveform utilizing a non-linear slope of the timing circuit of FIG. 4.

FIG. 5B illustrates a similar voltage waveform VTIM 528 as FIG. 5A, however, the slope $m_2$ is a variable slope. As illustrated in switching periods $T_S$ 509 and 511, the voltage waveform VTIM 528 rises with slope $m_1$ until the on-time $t_{ON}$ is substantially equal to the critical time $t_C$ 514. Once the critical time $t_C$ 514 is reached, the timing voltage VTIM 528 decreases with an adaptable slope $m_2$ for the remainder of the on-time $t_{ON}$. Once the switch S1 110 is turned off, the timing voltage VTIM 528 decreases with slope $m_3$ until the lower reference voltage $V_L$ 530 is reached. However, the slope $m_2$ is variable. In one embodiment, the slope $m_2$ may vary as a function of the duty ratio D.

As mentioned above with regards to equation (14), when slope $m_2$ is constant, the ratio between slope $m_2$ and slope $m_1$ may be expressed in terms of the maximum duty ratio $D_{MAX}$:

$$\left|\frac{m_2}{m_1}\right| \leq \frac{1 - D_{MAX}}{D_{MAX}}.$$

However, by varying the slope $m_2$ within each switching period, the switching frequency $f_S$ may vary less from the base frequency than if the slope $m_2$ was kept constant. In other words, by varying the slope $m_2$, there is less of a reduction in the switching frequency than if a constant slope $m_2$ was utilized. Thus, in one embodiment, the ratio between the slope $m_2$ and slope $m_1$ may be expressed in terms of the duty ratio:

$$\left|\frac{m_2}{m_1}\right| = \frac{1 - D}{D} \quad (16)$$

Equation (9) illustrates that the extension coefficient k may be expressed as a function of slope $m_2$ and slope $m_1$. As such, the extension coefficient k may also be variable as a function of the duty ratio D. Further, by substituting equation (16) into equation (10) above, the switching period $T_S$ may be expressed in terms of the duty ratio D and the base period T0 when slope $m_2$ is non-zero:

$$T_S = \frac{T0}{4(1-D)D} \quad (17)$$

In yet another embodiment, slope $m_2$ is equal to zero, where equation (17) can be further simplified to:

$$T_S = \frac{T0}{2(1-D)} \quad (18)$$

Figure 6:
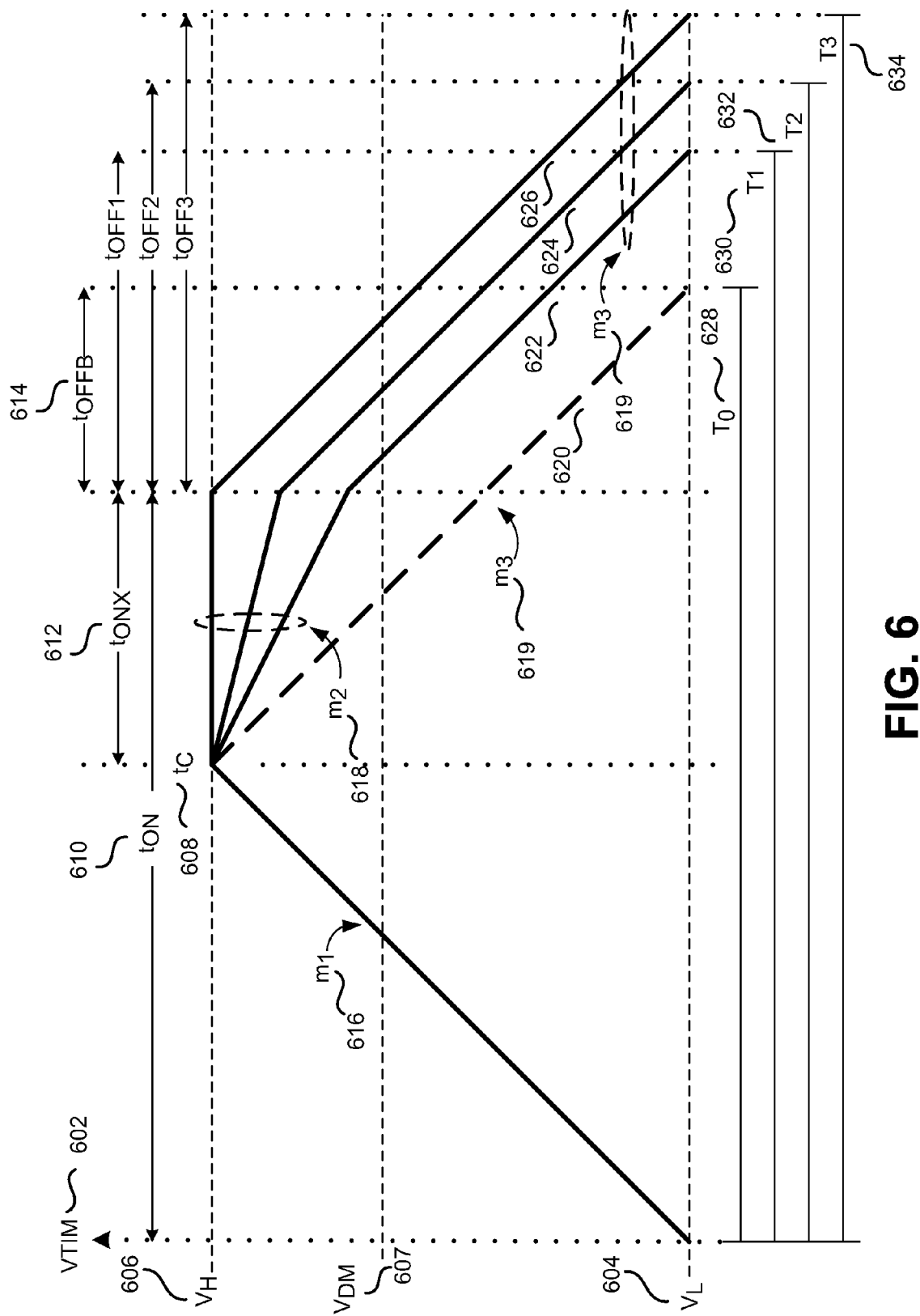
FIG. 6 is a diagram illustrating various embodiments of the voltage waveform of FIG. 5.

Referring next to FIG. 6, a diagram illustrating various embodiments of the timing voltage waveform VTIM 602 with slope $m_2$ of timing circuit 404 is shown including a lower reference voltage $V_L$ 604, an upper reference voltage $V_H$ 606, a max duty ratio voltage $V_{DM}$ 607, a critical time $t_C$ 608, an on-time $t_{ON}$ 610, an extended on-time $t_{ONX}$ 612, a base off-time $t_{OFFB}$ 614, a slope $m_1$ 616, a slope $m_2$ 618 and a slope $m_3$ 619. Illustrated is timing waveforms 622, 624, and 626. FIG. 6 illustrates the changes to the respective switching period $T_S$ and off-time $t_{OFF}$ of each timing waveform 622, 624, and 626 with varying values of slope $m_2$ 618. Further included in FIG. 6 is waveform 620 (in dashed lines) which illustrates the properties of the timing circuit 404 if the switching period $T_S$ and frequency $f_S$ were not varied when the on-time $t_{ON}$ 610 is greater than the critical time $t_C$ 608. The various embodiments of the timing voltage waveform VTIM 602 illustrated in FIG. 6 follow similar properties as the voltage waveform VTIM 528 illustrated in FIG. 5.

As shown in FIG. 6, the timing voltage VTIM 602 increases until the upper reference voltage $V_H$ 606. Once the upper reference voltage $V_H$ 606 is reached the timing voltage VTIM 602 decreases until the lower reference voltage $V_L$ 604 is reached. The time it takes for the timing voltage VTIM 602 to reach the upper reference voltage $V_H$ 606 and then fall to the lower reference voltage $V_L$ 604 is substantially the switching period $T_S$ for the particular switching cycle. In the example shown in FIG. 6, the timing circuit 404 alters the switching period or switching frequency by altering the rate of decrease to the lower reference voltage $V_L$ 604.

Further, the controller 122, and subsequently the timing circuit 404, switches to an alternative discharging mode when the on-time $t_{ON}$ 610 is greater than the critical time $t_C$ 608. In other words, the switching period and switching frequency are varied once the on-time $t_{ON}$ 610 is greater than the critical time $t_C$ 608. In addition, the upper reference voltage $V_H$ 606 is chosen such that, when the timing voltage VTIM 602 reaches the upper reference voltage $V_H$ 606, the on-time $t_{ON}$ 610 substantially equal to the critical time $t_C$ 608. In one embodiment, the controller 122, and subsequently the timing circuit 404, may switch to an alternative discharging mode when the timing voltage VTIM 602 reaches the upper reference voltage $V_H$ 606. As will be illustrated, how much the switching period and switching frequency are varied depends partially on the properties of the alternative discharging mode of timing circuit 404.

Waveforms 622, 624, and 626 each illustrate the timing voltage VTIM 602 increasing at the beginning of on-time $t_{ON}$ 610 with slope $m_1$ 616 until the upper reference voltage $V_H$ 606 (corresponding to the on-time $t_{ON}$ 610 is substantially equal to the critical time $t_C$ 608). Once the upper reference voltage $V_H$ 606 is reached, the timing voltage VTIM 602 switches to an alternative discharging mode if the switch S1 110 is still on. In other words, timing voltage VTIM 602 decreases with slope $m_2$ 618 for the remainder of the on-time $t_{ON}$ 610 that extends past the critical time $t_C$ 608, otherwise referred to as extended on-time $t_{ONX}$ 612. As mentioned above, in one embodiment the magnitude of slope $m_3$ 619 is substantially equal to the magnitude of slope $m_1$ 616.

However, waveform 620 illustrates a timing voltage of a conventional controller that does not include an alternative discharging mode as disclosed herein. As a result, the switching period $T_S$ for waveform 620 is substantially equal to the base period T0 628. In addition, the off-time for waveform 620 is substantially equal to the base off-time $t_{OFFB}$ 614. As shown in FIG. 6, the resultant waveform 620 is the same as the timing waveform when the on-time $t_{ON}$ is less than or equal to the critical time $t_C$. Thus, sub-harmonic oscillation may still occur when duty ratios are greater than 50%.

For waveform 622, slope $m_2$ 618 is substantially equal one-half slope $m_3$ 619 and one-half slope $m_1$ 616, or mathematically: $|m_2|=\frac{1}{2}|m_3|$; $|m_2|=\frac{1}{2}|m_1|$. As a result (and further shown by equation (10)), the switching period T1 630 of waveform 622 is extended past the base period T0 628 by one-half the extended on-time $t_{ONX}$ 612, or mathematically: T1=T0+½$t_{ONX}$. In addition, the off-time $t_{OFF1}$ of waveform 622 is also extended past the base off-time $t_{OFFB}$ 614 by one-half the extended on-time $t_{ONX}$ 612.

For waveform 624, slope $m_2$ 618 is substantially equal one-quarter slope $m_3$ 619 and one-quarter slope $m_1$ 616, or mathematically: $|m_2|=\frac{1}{4}|m_3|$; $|m_2|=\frac{1}{4}|m_1|$. As a result (and further shown by equation (10)), the switching period T2 632 of waveform 624 is extended past the base period T0 628 by three-quarters of the extended on-time $t_{ONX}$ 612, or mathematically: T1=T0+¾$t_{ONX}$. In addition, the off-time $t_{OFF2}$ of waveform 624 is also extended past the base off-time $t_{OFFB}$ 614 by three-quarters the extended on-time $t_{ONX}$ 612.

For waveform 626, slope $m_2$ 618 is substantially equal to zero, or mathematically: $m_2$=0. As a result (and further shown by equation (10)), the switching period T3 634 of waveform 626 is extended past the base period T0 628 by the extended on-time $t_{ONX}$ 612, or mathematically: T1=T0+$t_{ONX}$. The off-time $t_{OFF3}$ of waveform 626 is also extended past the base off-time $t_{OFFB}$ 614 by the extended on-time $t_{ONX}$ 612. In particular, when slope $m_2$ 618 is substantially equal to zero, the off-time $t_{OFF3}$ is substantially fixed for each switching cycle.

For waveforms 622, 624, and 626, once the switch S1 110 turns off and the off-time begins, the timing circuit 404 (and as a result the timing voltage VTIM 602) returns to a normal discharging mode. As discussed above, the timing voltage VTIM 602 decreases with slope $m_3$ 619 until the lower reference voltage $V_L$ 604 is reached.

By selecting the value of slope $m_2$ 618, sub-harmonic oscillation may be prevented. As mentioned above, when the ratio between the magnitude of slope $m_2$ 618 and the magnitude of slope $m_1$, $$\left|\frac{m_2}{m_1}\right| \le \frac{1-D}{D},$$

sub-harmonic oscillation may be prevented. In one embodiment, slope $m_2$ 618 is one-half of slope $m_1$ 616. As shown in FIG. 6, the smaller the value of slope $m_2$ 618 with respect to slope $m_1$ 616, the longer the switching period $T_S$ is extended beyond the base period T0 628. However, output power of the power supply 100 is proportional to the switching frequency $f_S$. The longer the switching period $T_S$, the smaller the switching frequency $f_S$, which may result in a drop in the output power.

As mentioned above, frequency modulation for EMI emissions (also referred to as frequency jitter) may also be utilized with varying of the switching frequency. In one embodiment, frequency jitter may be accomplished by varying the slope $m_1$ 616.

Figure 7:
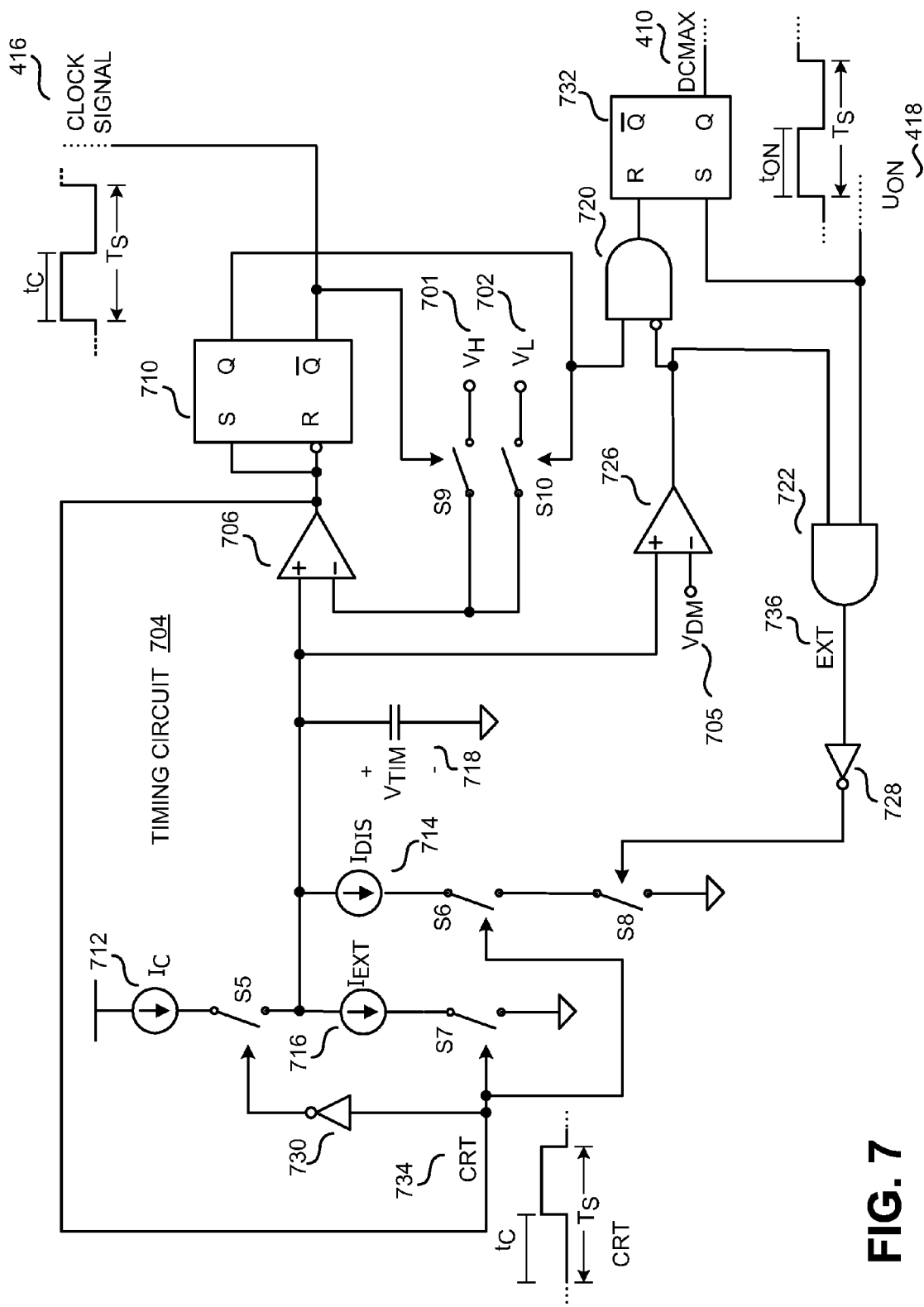
FIG. 7 is a timing circuit in accordance with embodiments of the present invention.

Referring next to FIG. 7, an example timing circuit 704 which may be utilized as timing circuit 404 of FIG. 4 is illustrated including an upper reference voltage $V_H$ 701, a lower reference voltage $V_L$ 702, a max duty ratio voltage $V_{DM}$ 705, a comparator 706, a latch 710, a current source 712 with charge current $I_C$, a current sink 714 with discharge current $I_{DIS}$, a current sink 716 with extension current $I_{EXT}$, and capacitor 718 (i.e., a timing capacitor) with timing voltage $V_{TIM}$. The timing circuit 704 further includes AND gates 720 and 722, a comparator 726, inverters 728 and 730, and a latch 732. Further illustrated in FIG. 7 are on-time signal $U_{ON}$ 418, DCMAX signal 410, clock signal 416, critical signal (CRT) 734, and extension signal (EXT) 736. Further shown are switches S5, S6, S7, S8, S9 and S10.

The current source 712 charges capacitor 718 (i.e., a timing capacitor) with charge current $I_C$ to an upper reference voltage $V_H$ 701. The magnitude of the charge current $I_C$ partially determines the value of slope $m_1$, discussed with respect to FIGS. 5A, 5B and 6. Once the timing voltage $V_{TIM}$ of the capacitor 718 reaches the upper reference voltage $V_H$ 701, the capacitor 718 is discharged through current sinks 714 and 716 with discharge current $I_{DIS}$ and extension current $I_{EXT}$, respectively, until the timing voltage $V_{TIM}$ across the capacitor 718 reaches the lower reference voltage $V_L$ 702. The magnitudes of the discharge current $I_{DIS}$ and the extension current $I_{EXT}$ partially determine the value of slopes $m_2$ and $m_3$. In one embodiment, an additional current source (not shown) coupled to charge capacitor 718, in addition to current source 712, may be included to implement frequency jitter. In this example, the additional current source would provide a triangular current waveform (jitter current) to vary the value of slope $m_1$.

The difference between the upper reference voltage $V_H$ 701 and the lower reference voltage $V_L$ 702 is referred herein as the amplitude swing of the timing circuit 404. In one embodiment, the amplitude swing of the timing circuit 404 is fixed. When the amplitude swing is fixed, the time it takes for the voltage $V_{TIM}$ of capacitor 718 to charge to the upper reference voltage $V_H$ 701 and discharge to the lower reference voltage $V_L$ 702 determines the frequency and period of timing circuit 404. The timing voltage $V_{TIM}$ of capacitor 718 linearly increases and decreases depending on the value of the charge current $I_C$, extension current $I_{EXT}$, and discharge current $I_{DIS}$. In other words, the magnitudes of the charge current $I_C$, extension current $I_{EXT}$, and discharge current $I_{DIS}$ may determine the frequency of timing circuit 404 and therefore vary the switching frequency $f_S$ and switching period $T_S$ of switch S1 110.

As mentioned above, in embodiments the timing circuit 404 varies the switching frequency $f_S$ and switching period $T_S$ when the on-time $t_{ON}$ of the switch S1 110 is greater than a critical time $t_C$. As will be further discussed, in one example timing circuit 404 utilizes the extension current $f_S$ to vary the frequency of timing circuit 404 and therefore vary the switching frequency $f_S$ and switching period $T_S$ of switch S1 110 when the on-time $t_{ON}$ of the switch S1 110 is greater than a critical time $t_C$.

Figure 8:
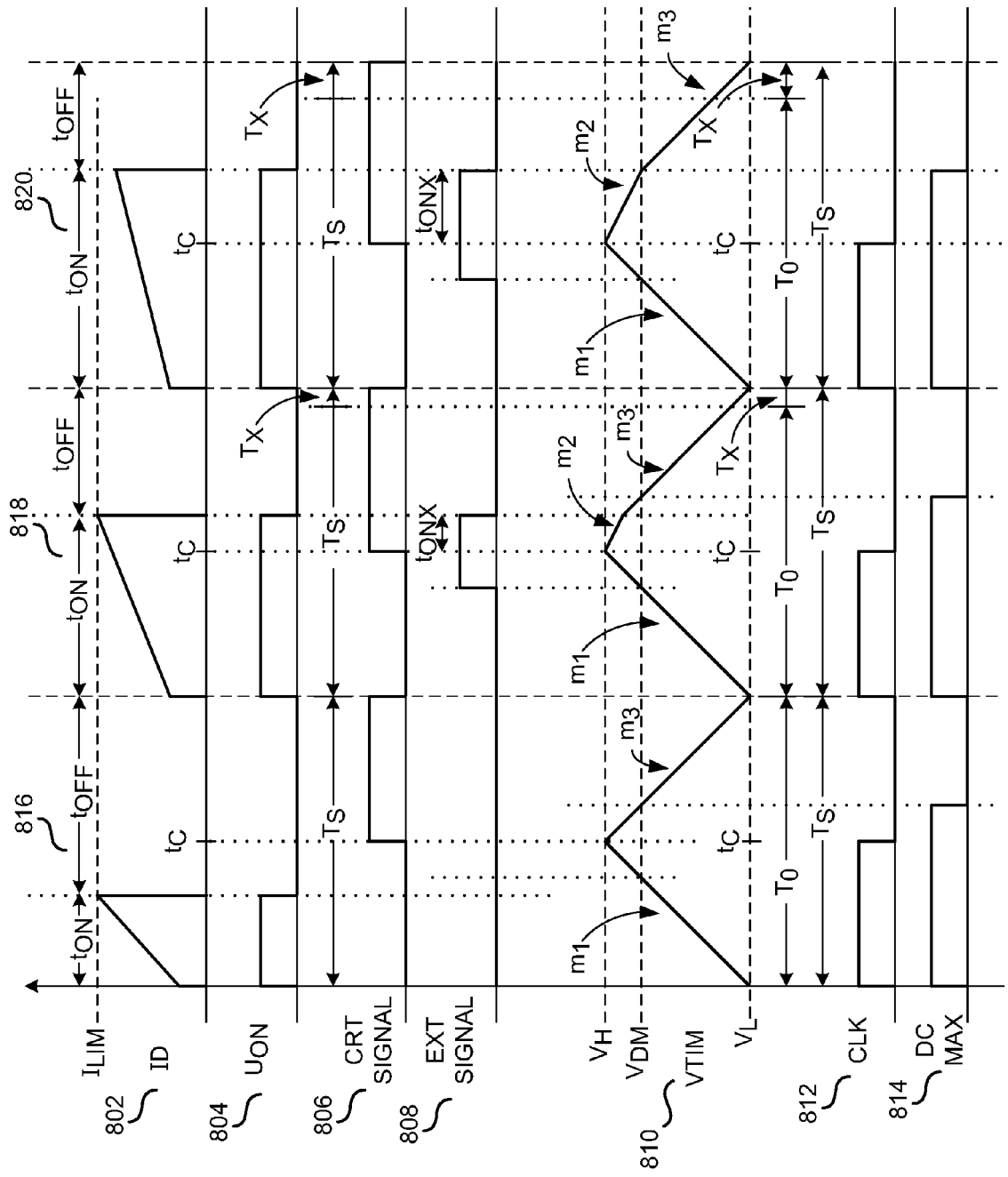
FIG. 8 is a timing diagram illustrating various waveforms of voltages and currents of the timing circuit of FIG. 7.

Capacitor 718 is coupled to comparator 706 such that the timing voltage $V_{TIM}$ is received at the non-inverting terminal of comparator 706. Further, the inverting terminal of comparator 706 may received either the lower reference voltage $V_L$ 702 or the upper reference voltage $V_H$ 701, depending on whether switch S9 or switch S10 is closed. The timing voltage $V_{TIM}$ waveform is illustrated in FIG. 8 as waveform VTIM. Further examples of the timing voltage waveform $V_{TIM}$ may be found with respect to FIGS. 5A, 5B and 6. The output of comparator 706 is also coupled to control switching of the switches S5, S6 and S7. As shown in FIG. 7, the output of comparator 706 may also be referred to as critical signal CRT 734. Since the upper reference voltage $V_H$ 701 corresponds to the value of the timing voltage $V_{TIM}$ when a time period substantially equal to the critical time $t_C$ has passed, the output of comparator 706 provides information regarding the critical time $t_C$. The critical signal CRT 734 (output of comparator 706) is coupled to control switching of switch S7 and S6. However, inverter 730 is coupled between the comparator 706 and switch S5. As such, the inverted critical signal CRT is coupled to control switching of switch S5. In other words, when the critical signal CRT 734 is logic low switch S5 is closed (i.e. ON) and switches S6 and S7 are open (i.e. OFF). When the critical signal CRT 734 is logic high, switch S5 is open (i.e. OFF) while switches S6 and S7 are closed (i.e. ON).

Current source 712 charges capacitor 718 with charge current $I_C$ when switch S5 is on and switches S6, S7, and S8 are off. Capacitor 718 is discharged through current sink 716 with extension current $I_{EXT}$ when switch S7 is on. The capacitor 718 is further discharged through current sink 714 with discharge current $I_{DIS}$ when both switches S6 and S8 are on. When switches S6, S7 and S8 are on, the capacitor 718 is discharged with a current substantially equal to the sum of the discharge current $I_{DIS}$ and the extension current $I_{EXT}$. For the example shown in FIG. 7, the magnitude of the extension current $I_{EXT}$ partially determines the value of slope $m_2$ while the magnitudes of both the discharge current $I_{DIS}$ and the extension current $I_{EXT}$ partially determine the value of $m_3$. In other words, the magnitude of the extension current $I_{EXT}$ corresponds to slope $m_2$ while the magnitude of discharge current $I_{DIS}$ corresponds to the difference between slope $m_3$ and slope $m_2$ (i.e., $I_{DIS}=m_3-m_2$). For the example where slope $m_2$ is substantially one half of slope $m_3$, the magnitude of the discharge current $I_{DIS}$ is substantially equal to the extension current $I_{EXT}$. In some embodiments, the timing circuit 704 alters the amount of time it takes for the timing voltage $V_{TIM}$ to reach the lower reference voltage $V_L$ 702 by altering the speed at which the capacitor 718 discharges to the lower reference voltage $V_L$ 702 and therefore altering the switching frequency $f_S$ and switching period of $T_S$ of the switch S1 110.

The output of comparator 706 is coupled to the inputs of latch 710. In the example shown, the output of comparator 706 is received at both the S-input of latch 710 and the R-input of latch 710. However, the small circle at the R-input of latch 710 indicates that the latch 710 receives the inverted output of comparator 706. In other words, the latch 710 will receive a logic high value at the S-input and a logic low value at the R-input, or vice versa.

Latch 710 has two outputs, the Q-output and the Q bar-output. When the latch 710 receives a logic high value at the S-input, the Q-output is logic high while the Q bar-output is logic low. When the R-input of latch 710 receives a logic high value, the Q-output is logic low while the Q bar-output is logic high. The outputs of the latch 710 are coupled to control the switching of switches S9 and S10. In the example shown, the Q bar-output controls the switching of switch S9 while the Q-output controls switching of switch S 10. In one embodiment, a logic high value corresponds to a closed (i.e. ON)

switch while a logic low value corresponds to an open (i.e. OFF) switch. Further, the Q bar-output of latch 710 is utilized as the clock signal 416.

Capacitor 718 further couples to comparator 726 such that the timing voltage $V_{TIM}$ is received at the non-inverting input. Comparator 726 receives the max duty ratio voltage $V_{DM}$ 705 at the inverting input of comparator 726. As mentioned above, the max duty ratio voltage $V_{DM}$ 705 ensures a minimum off-time of the switch S1 110. For the example of FIG. 7, the point which the timing voltage $V_{TIM}$ falls below the max duty ratio voltage $V_{DM}$ 705 corresponds to when the switch S1 110 has reached the maximum duty ratio. As illustrated in FIGS. 5A, 5B and 6, the timing voltage $V_{TIM}$ reaches the max duty ratio voltage $V_{DM}$ 705 twice during any given switching period $T_S$, however, it is the second instance of the timing voltage reaching the max duty ratio voltage $V_{DM}$ 705 which corresponds to the maximum duty ratio. In one embodiment, the maximum duty ratio is 62%.

The AND gate 720 is coupled to receive the inverted output of comparator 726 (as shown by the small circle at the input of AND gate 720) and the Q-output of latch 710. The AND gate 720 is further coupled to the R-input of latch 732 and the on-time signal $U_{ON}$ 418 is received at the S-input of latch 732. As such, the DCMAX signal 410 is logic high at the rising edge of the on-time signal $U_{ON}$ 418 and transitions to a logic low value when the latch 732 after the timing voltage $V_{TIM}$ has reached the upper reference voltage $V_H$ 701 and when the timing voltage $V_{TIM}$ has fallen below the max duty ratio voltage $V_{DM}$ 705. Thus, the output of the AND gate 720 indicates the time at which the timing voltage $V_{TIM}$ has fallen below the max duty ratio voltage $V_{DM}$ 705 after reaching the upper reference voltage $V_H$ 701, which is the second instance of the timing voltage reaching the max duty ratio voltage $V_{DM}$ 705 within a given switching period. In the example shown, the length of the logic high section of the DCMAX signal 410 corresponds to the maximum duty ratio.

The output of comparator 726 is further received at AND gate 722. AND gate 722 further receives the on-time signal $U_{ON}$ 418. The output of AND gate 722 is utilized as the extension EXT signal 736. Extension signal EXT 736 provides information regarding the extended on-time $t_{ONX}$ as discussed with the figures above. In the example shown, the extension signal EXT 736 provides information regarding the end of the extended on time $t_{ONX}$. The extension signal EXT 736 is received at inverter 728 which is then further coupled to control switching of switch S8. In one example, switch S8 is closed (i.e. ON) when the extension signal 736 is logic low and the switch S8 is open (i.e. OFF) when the extension signal is logic high. In operation, the AND gate 722 is logic high when the output of comparator 726 is logic high and the on-time signal $U_{ON}$ 418 is logic high. At the beginning of the switching cycle, extension signal EXT 736 is logic low. Extension signal EXT 736 transitions to a logic high value once the timing voltage $V_{TIM}$ 718 reaches the max duty ratio voltage $V_{DM}$ 705. Extension signal EXT 736 then transitions to a logic low value at the end of the on-time $t_{ON}$. The extension signal EXT 736 may also transition to a logic low value when the timing voltage $V_{TIM}$ 718 falls below the max duty ratio voltage $V_{DM}$ 705. Thus, the output of the AND gate 722 may be utilized to indicate the end of the extended on time $t_{ONX}$.

In operation, the capacitor 718 charges when switch S5 is closed and switches S6 and S7 are open such that capacitor 718 is charged by current source 712 at the beginning of a switching period. The timing voltage $V_{TIM}$ on capacitor 718 increases with a slope determined by the charging current $I_C$ and the size of capacitor 718. Also, at the beginning of a switching period, switch S9 is closed and switch S10 is open. As such, the comparator 706 receives the upper reference voltage $V_H$ 701 and the timing voltage $V_{TIM}$ is compared to the upper reference voltage $V_H$ 701. When the timing voltage $V_{TIM}$ reaches the upper reference voltage $V_H$ 701, as registered by the CRT signal 734 indicating that the critical time $t_C$ has been reached, switch S5 turns off and switches S6 and S7 turn on. In addition, switch S9 turns off and switch S10 opens such that the comparator 706 now receives the lower reference voltage $V_L$ 702.

If the on-time $t_{ON}$ is less than the critical time $t_C$, the extension signal EXT 736 is logic low for the remainder of the switching period after the critical time $t_C$ is reached and as a result, switch S8 is on after the critical time $t_C$ is reached. With switches S6, S7 and S8 all on, capacitor 718 is discharged with both current sink 714 and current sink 716 in the normal discharging mode. In the normal discharging mode, capacitor 718 discharges with a slope determined by discharge current $I_{DIS}$ and the extension current $I_{EXT}$ until the timing voltage $V_{TIM}$ reaches the lower reference voltage $V_L$ 702.

However, if the on-time $t_{ON}$ is greater than the critical time $t_C$ then the controller switches to the alternative discharging mode and the extension signal EXT 736 switches to a logic high value. In addition, provided the timing voltage $V_{TIM}$ is still greater than the max duty ratio voltage VDM 705, indicating that the maximum duty ratio has not yet been reached, then the output of inverter 728 is also logic low. As such, the switch S8 is opened and current sink 714 is prevented from discharging the capacitor 718. Thus, in the alternative discharging mode, capacitor 718 may be discharged with current sink 716 and not current sink 714 with a slope determined by extension current $I_{EXT}$. Switch S8 turns on again, to return the controller to the normal discharging mode, if either the on-time $t_{ON}$ ends or the timing voltage $V_{TIM}$ drops to the max duty ratio voltage $V_{DM}$ 705.

Referring next to FIG. 8, a timing diagram illustrating various waveforms of voltages and currents of the timing circuit 704 of FIG. 7 is shown including a switch current ID 802, a on-time signal $U_{ON}$ 804, a critical signal CRT 806, an extension signal EXT 808, a timing voltage VTIM 810, a clock signal CLK 812, and a DCMAX signal 814. Further illustrated in FIG. 8 are switching periods $T_S$ 816, 818, and 820. Illustrated in each switching period $T_S$ 816, 818, and 820 are respective on-time $t_{ON}$, off-time $t_{OFF}$, critical time $t_C$, and base period T0. Switching periods $T_S$ 818 and 820 also illustrate an extended on-time $t_{ONX}$ and an extension period TX. The timing voltage VTIM 810 also illustrates an upper reference voltage $V_H$, a max duty ratio voltage $V_{DM}$, and a lower reference voltage $V_L$. In addition, timing voltage VTIM 810 may increase to the upper reference voltage $V_H$ with slope $m_1$. Timing voltage VTIM 810 may also decrease to the lower reference voltage $V_L$ with slope $m_2$ or $m_3$.

During switching period $T_S$ 816, the on-time $t_{ON}$ is less than the critical time $t_C$. At the beginning of switching period $T_S$ 816, the clock signal CLK 812 pulses to a logic high value and the drive signal 804 transitions to a logic high value. The switch S1 110 turns on and the switch current ID 802 begins to increase. When the switch current ID 802 reaches the current limit $I_{LIM}$, the switch S1 110 turns off and the on-time signal $U_{ON}$ 804 transitions to the logic low value. At the start of the switching period, switch S9 is on and switch S10 is off (see FIG. 7) and the timing voltage VTIM 810 is compared to the upper reference voltage $V_H$. The critical signal CRT 806 is the output of comparator 706. As such, the critical signal CRT 806 is logic low at the start of the switching period $T_S$ 816 and transitions to the logic high value when the timing voltage VTIM 810 is substantially equal to the upper reference voltage $V_H$. As mentioned above, the upper reference voltage $V_H$ corresponds to the value of the timing voltage VTIM when a time period substantially equal to the critical time $t_C$ has been reached. At the beginning of the switching period, the critical signal CRT 806 is logic low and switch S5 is on while switches S6 and S7 are off. The timing voltage VTIM 810 increases with slope $m_1$ (corresponding to when capacitor 718 is charged by current source 712 with charge current $I_C$) until the upper reference voltage $V_H$ is reached. Once the timing voltage VTIM 810 reaches the upper reference voltage $V_H$, switch S9 turns off and switch S10 turns on and the timing voltage VTIM 810 is compared to the lower reference voltage $V_L$. In addition, the critical signal CRT 806 transitions from a logic low value to a logic high value and switch S5 turns off while switches S6 and S7 are turned on. Further, the clock signal CLK 812 transitions to a logic low value.

However, in the example of switching period 816, the on-time $t_{ox}$ provided by the on-time signal $U_{ON}$ 804 is less than the critical time $t_C$. As a result, the extension signal EXT 808 is logic low for the remainder of the switching period $T_S$ 816 after the critical time $t_C$ is reached. As such, switch S8 is on at least after the critical time $t_C$ is reached for the remainder of the switching period $T_S$ 816. The timing voltage VTIM 810 decreases with slope $m_3$ (corresponding to capacitor 718 discharging through current sink 714 and 716 with the sum of the discharge current $I_{DIS}$ and the extension current $I_{EXT}$) until the lower reference voltage $V_L$ is reached. As shown in FIG. 8, the magnitude of slope $m_3$ is substantially equal to the magnitude of slope $m_1$. Clock signal CLK 812 pulses to the logic high value indicating the start of switching period $T_S$ 818 when the lower reference voltage $V_L$ is reached.

During switching period $T_S$ 818, the clock signal CLK 812 pulses to a logic high value and the drive signal 804 transitions to a logic high value signaling the beginning of the switching period. Switch S1 110 turns on and the switch current ID 802 begins to increases. As shown in FIG. 8, the switch current ID 802 has not reached the current limit $I_{LIM}$ at the critical time $t_C$. However, the switch current ID 802 reaches the current limit ILIM before the DC MAX signal 814 transitions to the logic low value.

Since the on-time $t_{ON}$ is greater than the critical time $t_C$ in switching period 818, the timing voltage VTIM 810 reaches the upper reference voltage $V_H$ before the switch current ID 802 reaches the current limit $I_{LIM}$. When the critical time $t_C$ is reached, the critical signal CRT 806 transitions to the logic high value and the clock signal CLK 812 transitions to a logic low value. Since the on-time signal $U_{ON}$ 804 is still logic high when the max duty ratio voltage VDM is reached, the extension signal EXT 808 transitions to the logic high value and switch S8 turns off. As such, timing voltage VTIM decreases with slope $m_2$ (corresponding to when capacitor 718 is only discharged by current sink 716 with extension current $I_{EXT}$).

The extension signal EXT 808 transitions to the logic low value prior to the timing voltage VTIM 810 falling below the max duty ratio voltage $V_{DM}$. Once the extension signal EXT 808 transitions to the logic low value, the output of the inverter 728 is logic high and switch S8 is turned on for the remainder of the switching period $T_S$ 818. The timing voltage VTIM 810 then decreases with slope $m_3$ (corresponding to capacitor 718 discharging through current sink 714 and 716 with the sum of the discharge current $I_{DIS}$ and the extension current $I_{EXT}$) until the lower reference voltage $V_L$ is reached. Clock signal CLK 812 pulses to the logic high value indicating the start of the next switching period $T_S$ 820 when the lower reference voltage $V_L$ is reached.

During switching period $T_S$ 820, the on-time $t_{ON}$ is greater than the critical time $t_C$, however, the switch current ID 802 does not reach the current limit $I_{LIM}$ before the DC MAX signal 814 transitions to the logic low value. As a result, the drive signal 128 transitions to the logic low value and switch S1 110 turns off because the maximum duty ratio was reached. At the beginning of switching period $T_S$ 820, the clock signal CLK 812 pulses to a logic high value and the drive signal 128 transitions to a logic high value. Switch S1 110 turns on and the switch current ID 802 begins to increases. As shown in FIG. 8, the switch current ID 802 has not reached the current limit $I_{LIM}$ at the critical time $t_C$.

Since the on-time $t_{ON}$ is greater than the critical time $t_C$, the timing voltage VTIM 810 reaches the upper reference voltage $V_H$ before the switch current ID 802 reaches the current limit $I_{LIM}$. When the critical time $t_C$ is reached, the critical signal CRT 806 transitions to the logic high value and the clock signal CLK 812 transitions to a logic low value. Since the on-time signal $U_{ON}$ is still logic high when the max duty ratio voltage VDM is reached, the extension signal EXT 808 transitions to the logic high value and switch S8 is turned on. As such, timing voltage VTIM decreases with slope m2 (corresponding to when capacitor 718 is only discharged by current sink 716 with extension current $I_{EXT}$).

The extension signal EXT 808 transitions to the logic low value because the timing voltage VTIM 810 falls below the max duty ratio voltage $V_{DM}$. Once the timing voltage VTIM 810 reaches the max duty ratio voltage $V_{DM}$ and falls below the max duty ratio voltage $V_{DM}$, the output of comparator 726 is logic low and the AND gate 722 receives the logic low value. As such, the switch S8 is turned on for the remainder of switching period $T_S$ 820. The timing voltage VTIM 810 decreases with slope $m_3$ (corresponding to capacitor 718 discharging through current sink 714 and 716 with the sum of the discharge current $I_{DIS}$ and the extension current $I_{EXT}$) until the lower reference voltage $V_L$ is reached.

In addition, the AND gate 720 receives logic high values from both the Q-output of latch 710 and the inverted output of comparator 726. Latch 732 resets and the DCMAX signal 814 transitions to the logic low value. The drive signal 128 transitions to the logic low value in response to the DCMAX signal 814 and the switch S1 110 turns off (corresponding to the end of the on-time $t_{ON}$ of the switch current ID 802 in switching period $T_S$ 820).

While the invention herein disclosed has been described by means of specific embodiments, examples and applications thereof, numerous modifications and variations could be made thereto by those skilled in the art without departing from the scope of the invention set forth in the claims.

What is claimed is:

1. A controller for use in a power supply, the controller comprising,
a pulse width modulation (PWM) circuit to generate a drive signal to control a switch to regulate an output of the power supply in response to a switch current through the switch and in response to a clock signal having a switching period; and
a timing circuit coupled to the PWM circuit to provide the clock signal, wherein the timing circuit includes:
a timing capacitor, where the switching period of the clock signal is based on a charging time that the timing capacitor charges to an upper reference voltage plus a discharging time that the timing capacitor discharges to a lower reference voltage;
a first current sink and a second current sink, both current sinks coupled to discharge the timing capacitor while the timing circuit is in a normal discharging mode that is when an on time of the switch is less than a threshold time, wherein the second current sink is prevented from discharging the timing capacitor such that the timing capacitor is discharged with the first current sink and not the second current sink while the timing circuit is in an alternative discharging mode that is when the on time of the switch exceeds the threshold time, wherein discharging the timing capacitor in the alternative discharging mode increases the switching period of the clock signal.

2. The controller of claim 1, wherein the switching period of the clock signal is fixed when the timing circuit is in the normal discharging mode.

3. The controller of claim 2, wherein the threshold time is equal to one-half the fixed switching period.

4. The controller of claim 1, wherein the timing circuit further comprises:
a first comparator coupled to compare a voltage on the timing capacitor with the lower reference voltage while the timing capacitor is discharging; and
a latch coupled to generate a pulse of the clock signal in response to an output of the first comparator indicating that the timing capacitor has discharged to the lower reference voltage.

5. The controller of claim 4, wherein the first comparator is coupled to compare the voltage on the timing capacitor with an upper reference voltage while the timing capacitor is charging, and wherein a time that it takes the timing capacitor to charge to the upper reference voltage corresponds to the threshold time.

6. The controller of claim 5, wherein an output of the first comparator is coupled to enable the first and second current sinks in response to the voltage on the timing capacitor reaching the upper reference voltage.

7. The controller of claim 6, wherein the timing circuit further comprises a logic gate coupled to receive an on-time signal representative of the on time of the switch, wherein an output of the logic gate is coupled to disable the second current sink if the on time of the switch exceeds the threshold time.

8. The controller of claim 7, wherein the logic gate is configured to keep the second current sink disabled until an end of the on time of the switch.

9. The controller of claim 1, wherein the timing circuit increases the switching period by an amount of time that is responsive to a difference in time between the on time of the switch and the threshold time.

10. The controller of claim 9, wherein the amount of time that the timing circuit increases the switching period is proportional to the difference in time between the on time of the switch and the threshold time.

11. The controller of claim 1, wherein the PWM circuit is coupled to turn off the switch in response to the switch current reaching a current limit.

12. The controller of claim 11, wherein the PWM circuit is coupled to receive a feedback signal representative of the output of the power supply and wherein the current limit is a variable current limit responsive to the feedback signal.

13. The controller of claim 1, wherein a magnitude of a current of the first current sink is substantially equal to a magnitude of a current of the second current sink.

14. A power supply, comprising:
an energy transfer element coupled to transfer energy between an input and an output of the power supply;
a switch coupled to control the transfer of energy through the energy transfer element; and
a controller coupled to provide a drive signal to control the switch to regulate the output of the power supply, wherein the controller includes:
a pulse width modulation (PWM) circuit to generate the drive signal in response to a switch current through the switch and in response to a clock signal having a switching period; and
a timing circuit coupled to the PWM circuit to provide the clock signal, wherein the timing circuit includes a timing capacitor, where the switching period of the clock signal is based on a charging time that the timing capacitor charges to an upper reference voltage plus a discharging time that the timing capacitor discharges to a lower reference voltage, wherein the timing circuit discharges the timing capacitor in a normal discharging mode that is when an on time of the switch is less than a threshold time and discharges the timing capacitor in an alternative discharging mode that is when the on time of the switch exceeds the threshold time, wherein discharging the timing capacitor in the alternative discharging mode increases the switching period of the clock signal.

15. The power supply of claim 14, wherein the timing circuit discharges the timing capacitor in the normal discharging mode such that a voltage across the timing capacitor decreases at a first slope, and wherein the timing circuit discharges the timing capacitor in the alternative discharging mode such that the voltage across the timing capacitor decreases at a second slope and a subsequent third slope.

16. The power supply of claim 15, wherein the second slope is zero and the third slope is non-zero.

17. The power supply of claim 15, wherein the second slope is a variable slope.

18. The power supply of claim 15, wherein the third slope is equal to the first slope.

19. The power supply of claim 15, wherein the timing circuit discharges the timing capacitor in the alternative discharging mode such that the voltage across the timing capacitor decreases at the second slope until an end of the on time of the switch and then at the subsequent third slope.

20. The power supply of claim 14, wherein the switching period of the clock signal is fixed when the timing circuit is in the normal discharging mode and, wherein the threshold time is equal to one-half the fixed switching period.

21. The power supply of claim 14, wherein a time that it takes the timing capacitor to charge to the upper reference voltage corresponds to the threshold time.

22. The power supply of claim 14, wherein the timing circuit increases the switching period by an amount of time that is responsive to a difference in time between the on time of the switch and the threshold time.

23. The power supply of claim 22, wherein the amount of time that the timing circuit increases the switching period is proportional to the difference in time between the on time of the switch and the threshold time.

* * * * *